(12) United States Patent
Sakaguchi et al.

(10) Patent No.: US 12,398,223 B2
(45) Date of Patent: Aug. 26, 2025

(54) METHOD FOR PRODUCING FLUORORESIN PARTICLES

(71) Applicant: TOSOH CORPORATION, Shunan (JP)

(72) Inventors: Kota Sakaguchi, Yokkaichi (JP); Tomoya Shimono, Yokkaichi (JP); Tomonari Nagai, Yokkaichi (JP); Kazunari Iwanaga, Yokkaichi (JP); Shohei Yumino, Yokkaichi (JP); Masao Tanabiki, Yokkaichi (JP); Toru Doi, Yokkaichi (JP)

(73) Assignee: TOSOH CORPORATION, Shunan (JP)

( * ) Notice: Subject to any disclaimer, the term of this patent is extended or adjusted under 35 U.S.C. 154(b) by 730 days.

(21) Appl. No.: 17/283,753

(22) PCT Filed: Oct. 8, 2019

(86) PCT No.: PCT/JP2019/039698
§ 371 (c)(1),
(2) Date: Apr. 8, 2021

(87) PCT Pub. No.: WO2020/075724
PCT Pub. Date: Apr. 16, 2020

(65) Prior Publication Data
US 2021/0380735 A1    Dec. 9, 2021

(30) Foreign Application Priority Data

Oct. 9, 2018   (JP) .................................. 2018-190833
Mar. 27, 2019  (JP) .................................. 2019-061860
Oct. 4, 2019   (JP) .................................. 2019-183819

(51) Int. Cl.
*C08F 124/00*   (2006.01)
*C08J 3/00*     (2006.01)
*C08J 3/14*     (2006.01)

(52) U.S. Cl.
CPC .............. *C08F 124/00* (2013.01); *C08J 3/14* (2013.01); *C08J 2337/00* (2013.01)

(58) Field of Classification Search
CPC . C08F 124/00; C08F 24/00; C08F 6/12; C08J 2337/00; C08J 2327/12; C08J 3/14
See application file for complete search history.

(56) References Cited

U.S. PATENT DOCUMENTS

| | | | |
|---|---|---|---|
| 5,408,020 A | 4/1995 | Hung et al. | |
| 2007/0021551 A1* | 1/2007 | Malvasi | C08F 6/16 524/544 |
| 2007/0043187 A1 | 2/2007 | Okamoto et al. | |
| 2009/0292093 A1 | 11/2009 | Matsuura et al. | |
| 2010/0056752 A1 | 3/2010 | Okamoto et al. | |
| 2010/0160598 A1* | 6/2010 | Saito | C08F 6/003 528/401 |
| 2017/0283523 A1* | 10/2017 | Saito | C08F 6/18 |
| 2022/0041767 A1 | 2/2022 | Yumino et al. | |

FOREIGN PATENT DOCUMENTS

| | | | | |
|---|---|---|---|---|
| CN | 1777962 A | | 5/2006 | |
| CN | 102352033 A | * | 2/2012 | ............... C08F 6/06 |
| CN | 103718105 A | | 4/2014 | |
| CN | 104520375 A | | 4/2015 | |
| CN | 107108907 A | | 8/2017 | |
| CN | 110291653 A | | 9/2019 | |
| EP | 0 773 244 A1 | | 5/1997 | |
| EP | 2 738 603 A1 | | 6/2014 | |
| EP | 3 239 215 A1 | | 11/2017 | |

(Continued)

OTHER PUBLICATIONS

Macromoecules; František et al; vol. 38, p. 4237-4245 (Year: 2005).*
Machine translation into English of CN-102352033-A; Xianhua et al (Year: 2012).*
Third Party Observations (Part 1 and Part 2) issued Oct. 20, 2022 in European Patent Application No. 19871889.2, 10 pages.
Combined Chinese Office Action and Search Report issued Aug. 5, 2023, in Chinese Patent Application No. 202211324416.X (with unedited computer-generated English translation), 15 pages.
International Search Report and Written Opinion of the International Searching Authority issued Dec. 17, 2019 in PCT/JP2019/039698, (with English translation of the International Search Report), 18 pages.

(Continued)

*Primary Examiner* — Karuna P Reddy
(74) *Attorney, Agent, or Firm* — Oblon, McClelland, Maier & Neustadt, L.L.P.

(57) ABSTRACT

A fluororesin including a residue unit of formula (1) and having a haze value equal to 2% or less of a heat-press molded product (thickness 1 mm) with a small haze value of a melt-molded product and a method for producing the same.

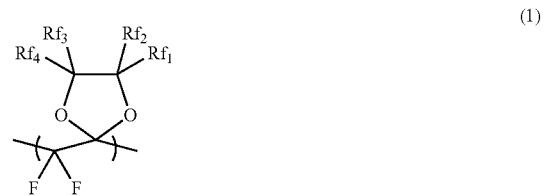

(1)

$Rf_1$, $Rf_2$, $Rf_3$ and $Rf_4$ each independently represent one of the groups consisting of a fluorine atom, a linear perfluoroalkyl group having 1 to 7 carbon atoms, a branched perfluoroalkyl group having 3 to 7 carbon atoms, and a cyclic perfluoroalkyl group having 3 to 7 carbon atoms, the perfluoroalkyl group may have an ethereal oxygen atom, $Rf_1$, $Rf_2$, $Rf_3$ and $Rf_4$ may be linked to each other to form a ring having 4 or more and 8 or less carbon atoms, and the ring may include an ethereal oxygen atom.

10 Claims, No Drawings

(56) References Cited

FOREIGN PATENT DOCUMENTS

| | | |
|---|---|---|
| EP | 3 582 278 A1 | 12/2019 |
| JP | 43-29154 B1 | 12/1968 |
| JP | 3-128940 A | 5/1991 |
| JP | 4-500388 A | 1/1992 |
| JP | 8-34820 A | 2/1996 |
| JP | 9-286931 A | 11/1997 |
| JP | 9-512854 A | 12/1997 |
| JP | 11-35626 A | 2/1999 |
| JP | 2006-342075 A | 12/2006 |
| JP | 2007-504125 A | 3/2007 |
| JP | 2007-517083 A | 6/2007 |
| JP | 2013-103172 A | 5/2013 |
| JP | 2013-234209 A | 11/2013 |
| JP | 2020-59784 A | 4/2020 |
| JP | 7225655 B2 | 2/2023 |
| WO | WO 95/30699 A1 | 11/1995 |
| WO | WO 2005/21526 A2 | 3/2005 |
| WO | WO 2005/21526 A3 | 3/2005 |
| WO | WO 2005/054313 A1 | 6/2005 |
| WO | WO 2008/075545 A1 | 6/2008 |
| WO | WO 2010/073940 A1 | 7/2010 |
| WO | WO 2011/129407 A1 | 10/2011 |
| WO | WO 2011/129408 A1 | 10/2011 |
| WO | WO 2012/029929 A1 | 3/2012 |
| WO | WO 2013/018730 A1 | 2/2013 |
| WO | WO 2013/024886 A1 | 2/2013 |
| WO | WO 2014/069165 A1 | 5/2014 |
| WO | WO 2014/156996 A1 | 10/2014 |
| WO | WO 2016/104379 A1 | 6/2016 |
| WO | WO 2018/181377 A1 | 10/2018 |
| WO | WO 2018/147230 A1 | 12/2019 |
| WO | WO 2020/067421 A1 | 4/2020 |
| WO | WO2020/075714 A1 | 4/2020 |

OTHER PUBLICATIONS

International Preliminary Report on Patentability and Written Opinion of the International Searching Authority issued Apr. 22, 2021 in PCT/JP2019/039698 (with English translation), 24 pages.
Chinese Office Action issued Dec. 6, 2022 in Chinese Patent Application No. 201980066286.4 (with English Translation), 11 pages.
Japanese Office Action issued Feb. 7, 2023 in Japanese Patent Application No. 2019-183819 (with English Translation), 10 pages.
Notice of Submission of Publications dated Sep. 27, 2022, issued in the corresponding Japanese patent application No. 2018-190833 (with English machine translation), 2 pages.
Third Party Observation dated Sep. 5, 2022, in the corresponding Japanese patent application No. 2018-190833, 5 pages.
Combined Chinese Office Action and Search Report issued Apr. 2, 2022, in Chinese Patent Application No. 201980066286.4 (with English translation), 16 pages.
Third Party Observation submitted on Sep. 21, 2021 in Japanese patent application No. 2018-190833, citing documents AO and AP therein, 83 pages.
Notice of Submission of Publications dated Oct. 26, 2021 issued in Japanese patent application No. 2018-190833, 3 pages (with English machine translation).
European Office Action issued on Jun. 26, 2023 in European Patent Application No. 19871889.2, 9 pages.
Japanese Office Action issued on Jul. 18, 2023 in Japanese Patent Application No. 2022-156602 (with English translation), 14 pages.
Partial Supplementary European Search Report issued Jun. 8, 2022 in European Patent Application No. 19871889.2, 12 pages.
Notice of Reasons for Refusal issued Jun. 14, 2022 in Japanese Patent Application No. 2018-190833 (with English machine translation), 10 pages.
Koichi Tamura, "II The technology of granulation," The Granulation Handbook, 1st edition, 1991, 5 pages.
Notice of Submission of Publications dated Aug. 30, 2022, issued in the corresponding Japanese patent application No. 2019-183819 with its English machine translation, 2 pages.
Third Party Observation submitted on Aug. 9, 2022, in the corresponding Japanese patent application No. 2019-183819, 14 pages.
Extended European Search Report dated Sep. 8, 2022, issued in the corresponding European patent application No. 19871889.2, 11 pages.
Y. Okamoto et al., "The effect of fluorine substituents on the polymerization mechanism of 2-methylene-1,3-dioxolane and properties of the polymer products", Journal of Fluorine Chemistry 128 (2007), pp. 202-206.
Mikes, F., et al., "Synthesis and Characterization of an Amorphous Perfluoropolymer: Poly(perfluoro-2-methylene-4-methyl-1,3-dioxolane)", Macromolecules, 2005, vol. 38, pp. 4237-4245.
Kagaku Sochi (Chemical apparatuses), Aug. 1995, pp. 71-79.
"Comparison of Agitating Characteristics between Pitched Impellers and Retreated Impellers", Shinko Pfaudler Technical Report, vol. 28. No. 3 (Oct. 1984), pp. 13-16.
Liu,W., et al., "Free-Radical Polymerization of Dioxolane and Dioxane Derivatives: Effect of Fluorine Substituents on the Ring Opening Polymerization", J. Polymer Science, Part A, 2004, vol. 42,pp. 5180-5188.
Mikes, F., et al., "Characterizations and properties of semicrystalline and amorphous perfluoropolymer: poly(perfluoro-2-methylene-1,3-dioxolane)", polymer advanced technologies, 2011, vol. 22, pp. 1272-1277.
Combined Chinese Office Action and Search Report issued Jan. 17, 2024 in Chinese Patent Application No. 202310277404.4 (with unedited computer-generated English translation), 18 pages.
Allowance issued Jul. 26, 2024 in Chinese Patent Application No. 202310277404 (with machine translation).
Japanese Office Action issued May 7, 2025 in Japanese Patent Application No. 2024-117038 (with unedited computer-generated English translation), 5 pages.

* cited by examiner

METHOD FOR PRODUCING FLUORORESIN PARTICLES

CROSS-REFERENCE TO RELATED APPLICATIONS

The present application is a 35 U.S.C. § 371 national stage patent application of International patent application PCT/JP2019/039698, filed on Oct. 8, 2019, which is based on and claims the benefits of priority to Japanese Application No. 2018-190833 filed on Oct. 9, 2018, Japanese Application No. 2019-061860 filed on Mar. 27, 2019, and Japanese Application No. 2019-183819 filed on Oct. 4, 2019. The entire contents of all of the above applications are incorporated herein by reference.

CROSS-REFERENCE TO RELATED APPLICATIONS

This application claims priority to Japanese Patent Application No. 2018-190833 filed on Oct. 9, 2018, Japanese Patent Application No. 2019-061860 filed on Mar. 27, 2019, and Japanese Patent Application No. 2019-183819 filed on Oct. 4, 2019, and entire descriptions thereof are incorporated herein as if specifically disclosed herein.

TECHNICAL FIELD

The present invention relates to a fluororesin, a method for producing the same, and a method for producing fluororesin particles.

BACKGROUND ART

Fluororesins including a fluorine-containing aliphatic ring structure are amorphous, have excellent transparency and excellent liquid repellency, durability, electrical properties, and the like, and are therefore used in various applications such as optical and electronic fields. In the optical field, amorphous fluoropolymers are used as optical members such as optical waveguides and pellicles, which are dust-proof films for semiconductor photomasks.

Among the fluororesins, those including an oxolane ring have a bulky ring structure, and are therefore amorphous and have high transparency and high heat resistance. In addition, since such resins are composed only of carbon, fluorine, and oxygen, they have high electrical characteristics, chemical resistance, waterproofness, and liquid-repellent and oil-repellent properties. Furthermore, since the resins are amorphous, they can be melt-molded.

NPL 1 describes the synthesis and properties of a polymer (poly-PFMMD) of perfluoro-2-methylene-4-methyl-1,3-dioxolane (PFMMD), which is a kind of fluororesin including an oxolane ring. Poly-PFMMD has excellent heat resistance. PTL 1 describes a cyclized polymer of perfluoro(4-vinyloxy-1-butene) as a fluororesin.

[Patent Literature (PTL) 1] WO 2014/156996
[Non-Patent Literature (NPL) 1] Macromolecules 2005, 38, 4237-4245

The descriptions of PTL 1 and NPL 1 are incorporated herein in their entirety, in particular, as a disclosure.

SUMMARY OF INVENTION

Technical Problem

According to the studies by the present inventors, the resin produced by the method of NPL 1 has a problem that the haze value of a melt-molded product is high.

An object of the first aspect of the present invention is to solve the abovementioned problem of fluororesins including an oxolane ring, and specifically to provide a fluororesin including an oxolane ring that has a small haze value of a melt-molded product and a method for producing the same.

Fluororesins are generally provided in the form of a solution, but in the case of melt molding, the resin is required to be in the form of particles because the resin can be continuously supplied to the inside of the molding machine. Further, also in a wide range of other applications, the resin is required to be in the form of particles from the viewpoint of handleability and solubility.

In PTL 1, suspension polymerization is exemplified as a method for obtaining particles of the fluororesin. However, the dispersant and emulsifier used as the polymerization aid remained inside the resin particles and became foreign matter or caused coloring when heated, which could degrade the transparency and electrical characteristics of the fluororesin. Further, according to the results obtained by the present inventors, with suspension polymerization, particles cannot be obtained without using a dispersant.

Further, in order to ensure strict cleanliness required in the optical and electronic fields, it is desirable to filter the fluororesin solution to remove foreign matter and then perform granulation. For that purpose, it is necessary to dissolve the fluororesin in a good solvent to prepare a solution. However, according to the results obtained by the present inventors, in a method generally known as a reprecipitation method in which a polymer solution obtained by dissolving in a good solvent is dropped into a poor solvent to obtain a powder, the fluororesin is in the strand-like or fluffy form. The resulting problem is that the fluororesin is difficult to take out as particles.

In view of the above problems, an object of the second aspect of the present invention is to provide a method for producing fluororesin particles including a fluorine-containing aliphatic ring structure, the method excelling in productivity and making it possible to remove foreign matter.

Solution to Problem

The first aspect of the present invention is as follows.
[1-1]
A fluororesin including a residue unit represented by a following general formula (1) and having a haze value of 2% or less of a heat-press molded product (thickness 1 mm).

[C1]

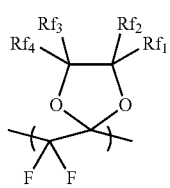

(1)

(In the formula (1), $Rf_1$, $Rf_2$, $Rf_3$ and $Rf_4$ each independently represent one of the groups consisting of a fluorine atom, a linear perfluoroalkyl group having 1 to 7 carbon atoms, a branched perfluoroalkyl group having 3 to 7 carbon atoms, and a cyclic perfluoroalkyl group having 3 to 7 carbon atoms, the perfluoroalkyl group may have an ethereal oxygen atom, $Rf_1$, $Rf_2$, $Rf_3$ and $Rf_4$ may be linked to each other to form a ring having 4 or more and 8 or less carbon atoms, and the ring may include an ethereal oxygen atom.)

[1-2]

The fluororesin according to [1-1], wherein the amount of an insoluble matter when the fluororesin is dissolved in 1,1,1,2,3,4,4,5,5,5-decafluoro-3-methoxy-2-(trifluoromethyl)pentane is 0.2% by weight or less based on the fluororesin.

[1-3]

The fluororesin according to [1-1] or [1-2], wherein the fluororesin has a bulk density of 0.1 g/cm$^3$ to 1.5 g/cm$^3$.

[1-4]

The fluororesin according to [1-1] or [1-2], wherein the fluororesin has a bulk density of 0.12 g/cm$^3$ to 0.25 g/cm$^3$.

[1-5]

The fluororesin according to any one of [1-1] to [1-4], wherein the yellow index of a heat-melted molded product (thickness 3 mm) of the fluororesin after heating for 24 h at 280° C. of 4 or less.

[1-6]

The fluororesin according to any one of [1-1] to [1-5], wherein the fluororesin has a weight average molecular weight of $5 \times 10^4$ to $3 \times 10^5$.

[1-7]

A method for producing a fluororesin that has a haze value of 2% or less of a heat-press molded product (thickness 1 mm), the method including:
a polymerization step (1) of polymerizing a monomer represented by a following general formula (4) in the presence of a radical polymerization initiator, to obtain a fluororesin A including a residue unit represented by a general formula (5);
an insoluble matter removal step (2) of removing an insoluble matter from a mixture containing the fluororesin A including the residue unit represented by the general formula (5), where the fluororesin A has been obtained in the polymerization step, and a solvent S2, to obtain a fluororesin A solution; and
a precipitation step (3) of precipitating the fluororesin A from the fluororesin A solution obtained in the insoluble matter removal step.

[C2]

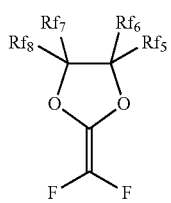

(4)

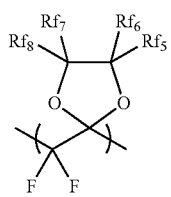

(5)

(In the formulas (4) and (5), $Rf_5$, $Rf_6$, $Rf_7$, and $Rf_8$ are each independently one of the groups consisting of a fluorine atom, a linear perfluoroalkyl group having 1 to 7 carbon atoms, a branched perfluoroalkyl group having 3 to 7 carbon atoms, or a cyclic perfluoroalkyl group having 3 to 7 carbon atoms, the perfluoroalkyl group may have an ethereal oxygen atom, $Rf_5$, $Rf_6$, $Rf_7$, and $Rf_8$ may be linked to each other to form a ring having 4 or more and 8 or less carbon atoms, and the ring may include an ethereal oxygen atom.)

[1-8]

The production method according to [1-7], wherein the polymerization step (1) is any of the following steps (1a), (1b) or (1c):
(1a) a step of polymerizing a monomer represented by the general formula (4) in the presence of a radical polymerization initiator and a good solvent c1 for the fluororesin A, to obtain a mixture containing the fluororesin A and the good solvent b1;
(1b) a step of polymerizing a monomer represented by the general formula (4) in the presence of a radical polymerization initiator and a poor solvent c1 for the fluororesin A, precipitating the fluororesin A, recovering the precipitated fluororesin A, and mixing the recovered fluororesin A and the good solvent b1 for the fluororesin A, to obtain a mixture of the fluororesin A and the good solvent b1 for the fluororesin A; and
(1c) a step of polymerizing a monomer represented by the general formula (4) in the presence of a radical polymerization initiator and the poor solvent c1 for the fluororesin A, precipitating the fluororesin A, and mixing the good solvent b1 for the fluororesin A, to obtain a mixture containing the fluororesin A, the good solvent b1, and the poor solvent c1.

[1-9]

The production method according to [1-8], wherein in step (1a), polymerization is carried out in the presence of the poor solvent c1 for the fluororesin A in addition to the radical polymerization initiator, and the good solvent b1 for the fluororesin A.

[1-10]

The production method according to any one of [1-7] to [1-9], wherein the insoluble matter removal step (2) is one of the following steps (2a) or (2b):
(2a) a step of filtering the mixture containing the fluororesin A and the solvent S2 with a filter to remove insoluble matter; and
(2b) a step of centrifuging the mixture containing the fluororesin A and the solvent S2 to remove insoluble matter.

[1-11]

The production method according to [1-10], wherein the solvent S2 is a good solvent b2 for the fluororesin A or a mixed solvent of the good solvent b2 and a poor solvent c2 for the fluororesin A.

[1-12]

The production method according to [1-10] or [1-11], wherein the insoluble matter removal step (2) is (2a).

[1-13]

The production method according to any one of [1-10] to [1-12], wherein the filter is a filter having a 99% supplementary particle diameter of 10 μm or less or a screen filter having a pore diameter of 10 μm or less.

[1-14]

The production method according to any one of [1-7] to [1-13], wherein the precipitation step (3) is any of the following steps (3a), (3b), (3c), and (3d):
(3a) a step of lowering the temperature of the fluororesin A solution to precipitate the fluororesin A;
(3b) a step of precipitating the fluororesin A by adding the fluororesin A solution to a poor solvent c3 for the fluororesin A;

(3c) a step of precipitating the fluororesin A by adding a poor solvent c3 for the fluororesin A solution to the fluororesin A solution; and (3d) a step of precipitating the fluororesin A by volatilizing the solvent from the fluororesin A solution.

[1-15]

The production method according to [1-14], wherein the solvent of the fluororesin A solution in the precipitation step (3a) is a mixed solvent of a good solvent b3 for the fluororesin A and a poor solvent c3 for the fluororesin A.

[1-16]

The production method according to [1-14] or [1-15], wherein in the precipitation step (3a), the solution temperature $T_1$ before lowering the temperature is 30° C. or higher, and assuming that the solution temperature after lowering the temperature is $T_2$, $T_1-T_2$ is 5° C. or higher.

[1-17]

The production method according to any one of [1-7] to [1-16], further including:

a separation step (5) of separating the fluororesin A from a solution which was obtained in the precipitation step (3) and in which the fluororesin A was precipitated, or from a solution obtained by adding a poor solvent c4 in a poor solvent addition step (4), and a washing step (6) of washing the separated fluororesin A with a poor solvent c5.

[1-18]

The production method according to any one of [1-14] to [1-17], wherein the polymerization step (1) is step (1b), and the precipitation step (3) is step (3a), (3b), (3c), or (3d).

[1-19]

The production method according to any one of [1-14] to [1-18], wherein the precipitation step (3) is step (3a) or (3c).

[1-20]

The production method according to any one of [1-14] to [1-17], wherein the precipitation step (3) is any of the steps (3a), (3b), and (3c), and the solvent S2 is an aliphatic fluorine-containing solvent.

[1-21]

The production method according to any one of [1-7] to [1-20], wherein the insoluble matter to be removed in the insoluble matter removal step (2) includes at least a fluororesin including a residue unit represented by the general formula (1).

The second aspect of the present invention is as follows.

[2-1]

A method for producing fluororesin particles that each contain a fluorine-containing aliphatic ring structure, the method including a precipitation step of lowering a solution temperature of a fluororesin (A) solution in which a fluororesin (A) including a fluorine-containing aliphatic ring structure is dissolved in a solvent (B), to precipitate particles of the fluororesin (A).

[2-2]

The method for producing fluororesin particles according to [2-1] wherein the solvent (B) is a composition containing a good solvent (b-1) for the fluororesin (A) and a poor solvent (b-2) for the fluororesin (A).

[2-3]

The method for producing fluororesin particles according to [2-2], wherein the good solvent (b-1) is an aromatic fluororesin-containing solvent or an aliphatic fluorine-containing solvent having a hydrogen atom in a molecule.

[2-4]

The method for producing fluororesin particles according to any one of [2-2] and [2-3], wherein the poor solvent (b-2) is a fluorine-containing solvent having a hydrogen atom in a molecule.

[2-5]

The method for producing fluororesin particles according to any one of [2-1] to [2-4], including a poor solvent addition step of adding a poor solvent (b-2) to the fluororesin (A) solution obtained in the precipitation step, and a separation step of solid-liquid separating particles of the fluororesin (A) after the poor solvent addition step.

[2-6]

The method for producing fluororesin particles according to any one of [2-1] to [2-5], wherein in the precipitation step, the solution temperature $T_1$ before lowering the temperature is 30° C. or higher, and assuming that the solution temperature after lowering the temperature is $T_2$, $T_1-T_2$ is 5° C. or higher.

[2-7]

The method for producing fluororesin particles according to any one of [2-1] to [2-6], wherein in the precipitation step, the temperature is lowered while stirring so that a Pv value that which is a value of stirrer motor power per unit stirring capacity is 0.2 kw/m³ to 50 kw/m³.

[2-8]

The method for producing fluororesin particles according to any one of [2-1] to [2-7], including a solution preparation step of obtaining the fluororesin (A) solution by a method including either a method of dissolving the fluororesin (A) in a solvent or a method of using a solution obtained by polymerizing the fluororesin (A).

[2-9]

The method for producing fluororesin particles according to any one of [2-1] to [2-8], including a filtration step of removing foreign matter by filtering a solution in which the fluororesin (A) is dissolved in a solvent.

[2-10]

The method for producing fluororesin particles including a fluorine-containing aliphatic ring structure according to any one of [2-1] to [2-9], wherein the fluororesin includes a residue unit represented by a following general formula (1).

[C3]

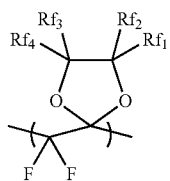

(1)

(In the formula (1), $Rf_1$, $Rf_2$, $Rf_3$ and $Rf_4$ each independently represent a fluorine atom or one of the groups consisting of a linear, branched, or cyclic perfluoroalkyl group having 1 to 7 carbon atoms, where the perfluoroalkyl group may have an ethereal oxygen atom, and $Rf_1$, $Rf_2$, $Rf_3$ and $Rf_4$ may be linked to each other to form a ring having 4 or more and 8 or less carbon atoms, and the ring may include an ethereal oxygen atom.)

Advantageous Effects of Invention

According to the first aspect of the present invention, it is possible to provide a fluororesin that includes a residue unit represented by the general formula (1) and has a haze value of 2% or less of a heat-press molded product (thickness 1 mm). According to the second aspect of the present invention, it is possible to provide a method for producing fluororesin particles including a fluorine-containing aliphatic ring structure, the method excelling in productivity and making it possible to remove foreign matter.

DESCRIPTION OF EMBODIMENTS

Fluororesin (First Aspect of the Present Invention)

The first aspect of the present invention relates to a fluororesin that includes a residue unit represented by the following general formula (1) and has a haze value of 2% or less of a heat-press molded product (thickness 1 mm).

[C4]

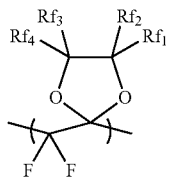
(1)

(In the formula (1), $Rf_1$, $Rf_2$, $Rf_3$ and $Rf_4$ each independently represent one of the groups consisting of a fluorine atom, a linear perfluoroalkyl group having 1 to 7 carbon atoms, a branched perfluoroalkyl group having 3 to 7 carbon atoms, and a cyclic perfluoroalkyl group having 3 to 7 carbon atoms, the perfluoroalkyl group may have an ethereal oxygen atom, $Rf_1$, $Rf_2$, $Rf_3$ and $Rf_4$ may be linked to each other to form a ring having 4 or more and 8 or less carbon atoms, and the ring may include an ethereal oxygen atom.)

The first aspect of the invention will be described in detail hereinbelow.

The first aspect of the present invention is a fluororesin including a residue unit represented by the specific general formula (1). Since the fluororesin of the first aspect of the present invention has a bulky ring structure included in the specific general formula (1), the fluororesin is amorphous and has high transparency and high heat resistance. In addition, the fluororesin has high electrical characteristics, chemical resistance, waterproofness, and liquid-repellent and oil-repellent properties because it is composed only of carbon, fluorine, and oxygen.

The $Rf_1$, $Rf_2$, $Rf_3$, and $Rf_4$ groups in the residue unit represented by the general formula (1) in the first aspect of the present invention each independently represent one of the groups consisting of a fluorine atom, a linear perfluoroalkyl group having 1 to 7 carbon atoms, a branched perfluoroalkyl group having 3 to 7 carbon atoms, and a cyclic perfluoroalkyl group having 3 to 7 carbon atoms. The perfluoroalkyl group may have an ethereal oxygen atom. $Rf_1$, $Rf_2$, $Rf_3$ and $Rf_4$ may be linked to each other to form a ring having 4 or more and 8 or less carbon atoms, and the ring may include an ethereal oxygen atom. $Rf_1$, $Rf_2$, $Rf_3$, and $Rf_4$ in the general formula (1) are synonymous with $R_{16}$, $Rf_6$, $Rf_7$, and $Rf_8$, respectively, in the general formulas (4) and (5) described hereinbelow, and specific examples of $Rf_1$, $Rf_2$, $Rf_3$ and $Rf_4$ which will be described below are also specific examples of $Rf_6$, $Rf_6$, $Rf_7$, and $Rf_8$.

Examples of the linear perfluoroalkyl group having 1 to 7 carbon atoms include a trifluoromethyl group, a pentafluoroethyl group, a heptafluoropropyl group, a nonafluorobutyl group, an undecafluoropentyl group, a tridecafluorohexyl group, and a pentadecafluoroheptyl group; examples of the branched perfluoroalkyl group having 3 to 7 carbon atoms include a heptafluoroisopropyl group, a nonafluoroisobutyl group, a nonafluoro sec-butyl group, and a nonafluoro tert-butyl group; and examples of the cyclic perfluoroalkyl group having 3 to 7 carbon atoms include a heptafluorocyclopropyl group, a nonafluorocyclobutyl group, and a tridecafluorocyclohexyl group. Examples of the linear perfluoroalkyl group which has 1 to 7 carbon atoms and may have an ethereal oxygen atom include a $—CF_2OCF_3$ group, a-$(CF_2)_2OCF_3$ group, and a $—(CF_2)_2OCF_2CF_3$ group; examples of the cyclic perfluoroalkyl group which has 3 to 7 carbon atoms and may have an ethereal oxygen atom include a 2-(2,3,3,4,4,5,5,6,6-decafluoro)-pyrinyl group, a 4-(2,3,3,4,4,5,5,6,6-d,ecafluoro)-pyrinyl group, and a 2-(2, 3,3,4,4,5,5-heptafluoro)-furanyl group.

In order to obtain excellent heat resistance, it is preferable that at least one of $Rf_1$, $Rf_2$, $Rf_3$ and $Rf_4$ be one of the groups consisting of a linear perfluoroalkyl group having 1 to 7 carbon atoms, a branched perfluoroalkyl group having 3 to 7 carbon atoms, and a cyclic perfluoroalkyl group having 3 to 7 carbon atoms.

Examples of the residue unit represented by the general formula (1) include residue units represented by the following formula (2).

[C5]

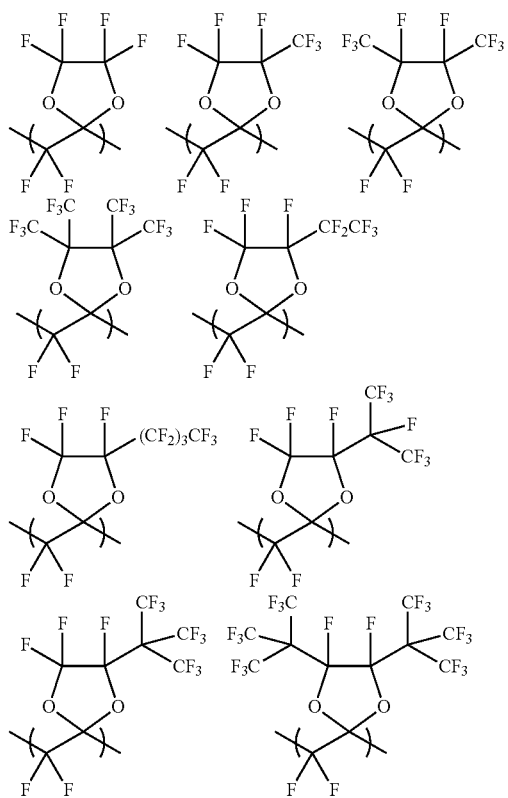
(2)

-continued

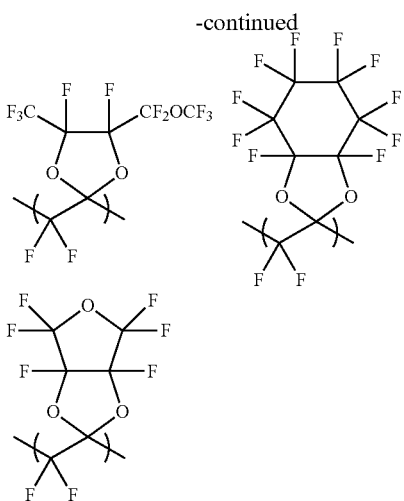

Among these, resin particles including residue units represented by the following formula (3) are preferable because they are excellent in heat resistance and molding processability, and a resin including perfluoro(4-methyl-2-methylene-1,3-dioxolane) residue unit is more preferable.

[C6]

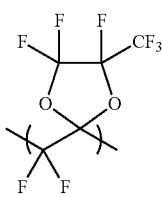

(3)

The fluororesin according to the first aspect of the present invention has a haze value of 2% or less of a melt-molded product (thickness 1 mm). The advantage of the haze value of the heat-press molded product (thickness 1 mm) being 2% or less is that an optical member having excellent transparency and excellent performance is obtained when the fluororesin is used therefor. A method for producing the fluororesin of the present invention in which the haze value of the heat-press molded product (thickness 1 mm) is 2% or less will be described hereinbelow. The haze value is measured by the following method. A mold in which the center of a 1 mm thick plate was hollowed out was placed on the smooth metal plate on which a polyimide film was placed, the fluororesin was placed on the hollowed-out portion, a polyimide film and a metal plate were placed thereon to sandwich the fluororesin, the sandwiched structure was placed on a press machine, heated at 280° C. for 10 min without applying pressure, then heated and pressed at a pressure of 10 MPa and 280° C. for 10 min with a press machine, then pressure release and heat-pressing under 10 MPa were repeated for 5 min, then heat pressing was performed at a pressure of 10 MPa and 280° C. for 10 min with a press machine, the pressure was thereafter released, and the molded product sandwiched between the metal plates was further sandwiched between metal plates for cooling and cooled to obtain a heat-press molded product (thickness 1 mm). The haze of the obtained heat-press molded product (thickness 1 mm) is measured according to JIS K 7136 by using a haze meter $NDH_{5000}$ (light source: white LED) manufactured by Nippon Denshoku Kogyo Co., Ltd. to determine the haze (%).

In the fluororesin according to the first aspect of the present invention, the haze value of the heat-press molded product (thickness 1 mm) is 2% or less, preferably 1% or less, more preferably 0.8% or less, and even more preferably 0.5% or less. There is no lower limit to the haze value, and the lower it is, the more preferable it is, but for example, 0.01% or more can be exemplified.

The fluororesin according to the first aspect of the present invention preferably has a yellow index (hereinafter, also referred to as "YI") of a heat-melted molded product (thickness 3 mm) after heating for 24 h at 280° C. of 6 or less. When the melt-molded product (thickness 3 mm) has a yellow index of 6 or less, an optical member having excellent transparency and excellent performance can be obtained when the fluororesin is used therefor. The YI is preferably 4 or less, more preferably 3 or less, more preferably 2 or less, and even more preferably 1 or less. There is no lower limit for YI, and the lower it is, the more preferable it is. For example, 0.01 or more can be mentioned. YI is measured by the following method. First, the transmittance of a fluororesin heat-melt molded product having a thickness of 3 mm is measured at a wavelength of 200 nm to 1500 nm using a spectrophotometer. Data for a wavelength of 380 nm to 780 nm are extracted from the measured transmittance data. From the transmittance data, tristimulus values X, Y, Z of an XYZ color system are calculated according to JIS Z 8701, and YI in the C light source is calculated according to JIS K 7373.

The fluororesin according to the first aspect of the present invention preferably has a bulk density of, for example, 0.1 $g/cm^3$ to 1.5 $g/cm^3$ in consideration of handleability, moldability, and the like. The bulk density is more preferably 0.25 $g/cm^3$ to 1.5 $g/cm^3$, and even more preferably 0.25 $g/cm^3$ to 1.0 $g/cm^3$. Further, it was clarified by the studies conducted by the present inventors that the YI shown by the fluororesin of the present invention is in a good range when the bulk density is in a specific range (see Examples 2 and 4 to 6). From this viewpoint, the bulk density is preferably 0.12 $g/cm^3$ to 0.25 $g/cm^3$, and more preferably 0.14 $g/cm^3$ to 0.22 $g/cm^3$. The measurement of bulk density is carried out as follows. The fluororesin A is weighed and placed, without applying vibration, in a glass sample tube which has a volume of 13.5 mL (the liquid level height when 10 mL of water is added is 2.8 cm) and for which the height per unit volume was measured in advance. From the height of the powder and the weight of the powder at that time, the bulk density can be calculated according to the following formula. The bulk density at this time is called loose bulk density.

Bulk density=(powder weight (g))/(powder height (cm)/0.28 (cm/mL))

The weight average molecular weight Mw of the fluororesin according to the first aspect of the present invention is not limited, and can be exemplified by $1 \times 10^3$ to $5 \times 10^7$. The weight average molecular weight Mw is preferably in the range of $5 \times 10^4$ to $5 \times 10^5$ because the haze value of the heat-press molded product is excellent. Further, the weight average molecular weight Mw is more preferably in the range of $5 \times 10^4$ to $3 \times 10^5$ because the haze value of the heat-press molded product is excellent. Where the weight average molecular weight Mw is in this range, the haze value of the heat-press molded product is excellent, and the melt viscosity at a shear rate of $10^{-2}$ s and 250° C. can be $1\times10^2$ to $3\times10^5$ Pa·s. As a result, the melt molding processability is excellent. Furthermore, the fluororesin is also excellent in defoaming property at the time of melting. In addition, where the weight average molecular weight Mw is in this range, cracks are less likely to occur during heating and cooling. From the viewpoints of excellent haze value, excellent melt molding processability, and excellent defoaming property at the time of melting, the fluororesin of the present invention preferably has a weight average molecular weight Mw in the range of $5\times10^4$ to $2\times10^5$, and where the weight average molecular weight Mw is in this range, the melt viscosity at a shear rate of $10^{-2}$ s and 250° C. can be $1\times10^2$ to $2\times10^4$ Pa·s, which is preferable because as a result, the melt molding processability is excellent, and the defoaming property is also excellent. From the viewpoint of excellent haze value, excellent melt molding processability, and excellent defoaming property during melting, the weight average molecular weight Mw is more preferably in the range of $5\times10^4$ to $1.5\times10^5$, and from the viewpoint of less crack generation during heating and cooling, the range is more preferably $6\times10^4$ to $1.5\times10^5$.

The weight average molecular weight Mw of the fluororesin according to the first aspect of the present invention can be determined by using gel permission chromatography (GPC), using, for example, standard polymethyl methacrylate having a known molecular weight as a standard sample, using a solvent capable of dissolving both the standard sample and the fluororesin as an eluant, and calculating from the elution time of the sample and the standard sample and the molecular weight of the standard sample. The solution can be exemplified by a solution obtained by adding 10% by weight of 1,1,1,3,3,3-hexafluoro-2-propanol (Wako Pure Chemical Industries, Ltd.) to ASAHIKLIN AK-225 (manufactured by Asahi Glass Co., Ltd.).

The molecular weight distribution Mw/Mn, which is the ratio of the weight average molecular weight Mw to the number average molecular weight Mn, of the fluororesin according to the first aspect of the present invention, is not particularly limited, but from the viewpoint of excellent haze value, suppression of yellowing after heating and melting, excellent melt molding processability, excellent defoaming property at the time of melting, and less crack generation during heating and cooling, the molecular weight distribution Mw/Mn is preferably 1.2 to 8, more preferably 1.2 to 5, still more preferably 1.5 to 3, and even more preferably 2.0 to 3. The number average molecular weight Mn can be measured by the same method as the above-mentioned method for measuring the weight average molecular weight Mw, and the molecular weight distribution Mw/Mn can be calculated by dividing the weight average molecular weight Mw by the number average molecular weight Mn.

The particle diameter of the fluororesin according to the first aspect of the present invention is not particularly limited, but the volume average particle diameter is preferably 1 μm to 10,000 μm, more preferably 1 μm to 2000 μm, even more preferably 1 μm to 1000 μm, and still more preferably 10 μm to 1000 μm because of excellent handleability during molding. The volume average particle diameter of the fluororesin of the present invention can be evaluated by measuring the particle diameter distribution (volume distribution) by a laser diffraction/scattering method. The particle diameter distribution determined by the laser diffraction/scattering method can be measured by dispersing the resin particles in water or an organic solvent such as methanol. As a laser scatterometer, Microtrack manufactured by Microtrack Bell Co., Ltd. can be exemplified. The volume average particle diameter is also called a Mean Volume Diameter, which is an average particle diameter expressed on a volume basis. Where the particle diameter distribution is divided for each particle diameter channel, the representative particle diameter value of each particle diameter channel is d, and the volume-based percentage for each particle diameter channel is v, the volume average particle diameter is represented by $\Sigma(vd)/\Sigma(v)$.

Since the fluororesin of the first aspect of the present invention has a small haze value, the amount of insoluble matter when the fluororesin is dissolved in 1,1,1,2,3,4,4,5,5,5-decafluoro-3-methoxy-2-(trifluoromethyl)pentane $(C_2F_5CF(OCH_3)C_3F_7$, manufactured by 3M Japan Ltd., Novec 7300) is preferably 0.2% by weight or less, more preferably 0.1% by weight or less, even more preferably 0.05% by weight or less, and still more preferably 0.01% by weight or less based on the fluororesin. The method for measuring the amount of insoluble matter is as follows. 1,1,1,2,3,4,4,5,5,5-Decafluoro-3-methoxy-2-(trifluoromethyl)pentane $(C_2F_5CF(OCH_3)C_3F_7$, manufactured by 3M Japan Ltd., Novec 7300) is added to the fluororesin to adjust the solid fraction concentration to 10% by weight. A fluororesin solution is prepared by dissolving at 50° C. for 5 h and stirring with shaking. The solution was pressure-filtered by a pressure filter equipped with a PTFE membrane filter that had a pore size of 0.1 μm and a prerecorded weight, the remaining fluororesin was washed by repeatedly performing pressure filtration by using Novec 7300 from which foreign matter was removed in advance by a filter having a pore size of 0.1 μm and introducing Novec 7300 from which foreign matter was removed into the pressure filter, the filter was then taken out and vacuum dried, the weight of the filter before filtration was subtracted from the obtained filter weight to determine the amount of residue on the filter, the amount of residue on the filter was divided by the weight of the resin used, and the amount of insoluble matter (% by weight) was determined by determining the ratio.

<Method for Producing Fluororesin (First Aspect of the Present Invention)>

A method for producing a fluororesin according to the first aspect of the present invention is a method for producing a fluororesin in which a haze value of a melt-molded product (thickness 1 mm) is 2% or less, the method including:

a polymerization step (1) of polymerizing a monomer represented by a following general formula (4) in the presence of a radical polymerization initiator, to obtain a fluororesin A including a residue unit represented by a general formula (5);

an insoluble matter removal step (2) of removing an insoluble matter from a mixture containing the fluororesin A including the residue unit represented by the general formula (5), which has been obtained in the polymerization step, and a solvent S2, to obtain a fluororesin A solution; and a precipitation step (3) of precipitating the fluororesin A from the fluororesin A solution obtained in the insoluble matter removal step.

[C7]

(4)

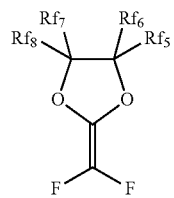

-continued

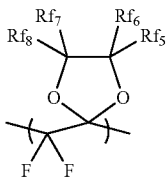
(5)

In the formulas (4) and (5), $Rf_5$, $Rf_6$, $Rf_7$, and $Rf_8$ are each independently one of the groups consisting of a fluorine atom, a linear perfluoroalkyl group having 1 to 7 carbon atoms, a branched perfluoroalkyl group having 3 to 7 carbon atoms, or a cyclic perfluoroalkyl group having 3 to 7 carbon atoms, perfluoroalkyl group may have an ethereal oxygen atom, $Rf_5$, $Rf_6$, $Rf_7$, and $Rf_6$ may be linked to each other to form a ring having 4 or more and 8 or less carbon atoms, and the ring may include an ethereal oxygen atom. $Rf_5$, $Rf_6$, $Rf_7$, and $Rf_8$ in the general formulas (4) and (5) are synonymous with $Rf_1$, $Rf_2$, $Rf_3$, and $Rf_4$ in the general formula (1), respectively.

Polymerization Step (1)

The polymerization step (1) is a step of performing polymerization of the monomer represented by the general formula (4) in the presence of a radical polymerization initiator to obtain the fluororesin A including the residue unit represented by the general formula (5). The polymerization method in the polymerization step (1) is not limited, and examples thereof include methods such as solution polymerization, precipitation polymerization, bulk polymerization, emulsion polymerization, and suspension polymerization.

In the production method of the first aspect of the present invention, the monomer represented by the general formula (4) is particularly preferably perfluoro (4-methyl-2-methylene-1,3-dioxolane) represented by the general formula (8), and the residue unit represented by the general formula (5) is particularly preferably the perfluoro (4-methyl-2-methylene-1,3-dioxolane) residue unit represented by the general formula (9).

[C9]

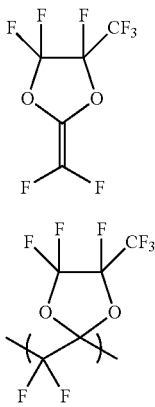

Examples of the radical polymerization initiator for performing radical polymerization include perfluoroorganic peroxides such as bis(perfluorobenzoyl) peroxide (PFBPO), $(CF_3COO)_2$, $(CF_3CF_2COO)_2$, $(C_3F_7COO)_2$, $(C_4F_9COO)_2$, $(C_5F_{11}COO)_2$, $(C_6F_{13}COO)_2$, $(C_7F_{15}COO)_2$, and $(C_8F_{17}COO)_2$; organic peroxides such as benzoyl peroxide, lauryl peroxide, octanoyl peroxide, acetyl peroxide, di-tert-butyl peroxide, tert-butyl cumyl peroxide, dicumyl peroxide, tert-butyl peroxyacetate, perfluoro(di-tert-butyl peroxide), bis(2,3,4,5,6-pentafluorobenzoyl) peroxide, tert-butylperoxybenzoate, and tert-butylperpivalate; and azo-based initiators such as 2,2'-azobis(2,4-dimethylvaleronitrile), 2,2'-azobis(2-butyronitrile), 2,2'-azobisisobutyronitrile, dimethyl-2,2'-azobisisobutyrate, and 1,1'-azobis(cyclohexane-1-carbonitrile).

From the viewpoint of a small haze value, suppressing yellowing after heating and melting, excellent melt molding processability, excellent defoaming property during melting, and less cracking during heating and cooling, the radical polymerization initiator is preferably a perfluoroorganic peroxide, and more preferably bis(perfluorobenzoyl)peroxide (PFBPO). Here, the perfluoroorganic peroxide refers to a compound having a structure in which a hydrogen atom of an organic peroxide is replaced with a fluorine atom.

The polymerization step (1) is appropriately carried out in the copresence of a solvent, and may be, for example, any of the following steps (1a), (1b) or (1c) depending on the type of the solvent:

(1a) a step of polymerizing a monomer represented by the general formula (4) in the presence of a radical polymerization initiator and a good solvent b1 for the fluororesin A, to obtain a mixture containing the fluororesin A and the good solvent b1;

(1b) a step of polymerizing a monomer represented by the general formula (4) in the presence of a radical polymerization initiator and a poor solvent c1 for the fluororesin A, precipitating the fluororesin A, recovering the precipitated fluororesin A, and mixing the recovered fluororesin A and the good solvent b1 for the fluororesin A, to obtain a mixture of the fluororesin A and the good solvent b1 for the fluororesin A; and (1c) a step of polymerizing a monomer represented by the general formula (4) in the presence of a radical polymerization initiator and the poor solvent c1 for the fluororesin A, precipitating the fluororesin A, and mixing the good solvent b1 for the fluororesin A, to obtain a mixture containing the fluororesin A, the good solvent b1, and the poor solvent c1.

In the first aspect of the present description, the good solvent for the fluororesin A means an organic solvent capable of dissolving the fluororesin A at 50° C. Capable of dissolving as referred to herein means that at least a part of the fluororesin A having a weight average molecular weight Mw of $5 \times 10^4$ to $15 \times 10^4$ is dissolved in the organic solvent. For example, in the case where 80% by weight or more of a fluororesin A sample is dissolved in a solvent when a 20-fold amount (w/w) of the fluororesin A sample is immersed in the organic solvent at 50° C. for 5 h or more, the solvent can be considered as a good solvent. Here, the fluororesin A can be a fluororesin including a residue unit represented by the general formula (3).

In the first aspect of the present description, a poor solvent for the fluororesin A means a solvent in which the fluororesin A is unlikely to dissolve. For example, in the case where the amount of a fluororesin A sample dissolved in a solvent is less than 20% by weight, preferably less than 10% by weight when the fluororesin A sample having a weight average molecular weight Mw of $5 \times 10^4$ to $15 \times 10^4$ is immersed in a 20-fold amount (w/w) of a solvent at 50° C. for 5 h or more and cooled to 25° C., the solvent can be considered as a poor solvent. Further, in the present invention, the poor solvent for the fluororesin A is also a solvent capable of precipitating the fluororesin A from the fluororesin A solution in which the fluororesin is dissolved in a good solvent. The poor solvent is preferably a solvent in which the fluororesin A is precipitated when a solution obtained by dissolving the fluororesin A in a good solvent is added dropwise to a solvent in an amount 10 times that of the good solvent at 25° C. Here, the fluororesin A can be a fluororesin including a residue unit represented by the general formula (3).

In the first aspect of the present description, the solvent is designated by S, the solvent used in step (1) is indicated by S1, the solvent used in step (2) is indicated by S2, the solvent used in step (3) is indicated by S3, the solvent used in step (4) is indicated by S4, and the solvent used in step (n) is indicated by Sn (n is an integer). The good solvent is designated by b, the good solvent used in step (1) is indicated by b1, the good solvent used in step (2) is indicated by b2, the good solvent used in step (3) is indicated by b3, the good solvent used in step (4) is indicated by b4, and the good solvent used in step (n) is indicated by bn (n is an integer). The poor solvent is designated by c, the poor solvent used in step (1) is indicated by c1, the poor solvent used in step (2) is indicated by c2, the poor solvent used in step (3) is indicated by c3, the poor solvent used in step (4) is indicated by c4, and the poor solvent used in step (n) is indicated by cn (n is an integer).

For example, the solvent that can be a good solvent is preferably at least one of the groups consisting of aliphatic fluorine-containing solvents such as perfluorocarbons, hydrochlorofluorocarbons, hydrofluorocarbons, hydrofluoroethers, and hydrofluoroolefins, or aromatic fluorine compounds, aliphatic fluorine-containing solvents are more preferable because a fluororesin having good coloring at the time of heating can be obtained, and it is even more preferable that the good solvent be at least one selected from the groups consisting of perfluorohexane, perfluoro-N-methylmorpholine, perfluoro-N-propylmorpholine, perfluorotriethylamine, perfluoromethyldibutylamine, perfluorotributylamine, $CF_3CF_2CHCl_2$, $CF_3CHFCHFCF_2CF_3$, $CF_3CF_2CF_2CF_2CF_2H$, $CF_3(CF_2)_5CH_2CH_3$, $C_4F_9OCH_3$, $C_4F_9OC_2H_5$, 1,1,1,2,3,4,4,5,5,5-decafluoro-3-methoxy-2-(trifluoromethyl)pentane ($C_2F_5CF(OCH_3)C_3F_7$), and hexafluorobenzene.

For example, perfluorocarbons such as FLUORINERT FC-5052, FC-72, FC-770, FC-3283, FC-40, FC-43 (all manufactured by 3M Japan Ltd.); hydrochlorofluorocarbons such as ASAHIKLINAK-225 (manufactured by Asahi Glass Co., Ltd.); hydrofluorocarbons such as VERTREL XF (manufactured by Chemours-Mitsui Fluoroproducts Co, Ltd.), ASAHIKLIN AC-2000, AC-6000 (all manufactured by Asahi Glass Co., Ltd.); hydrofluoroethers such as Novec 7100, Novec 7200, and Novec 7300 (manufactured by 3M Japan Ltd.); hydrofluoroolefins such as OPTEON SF10 (manufactured by Chemours-Mitsui Fluoroproducts Co, Ltd.); aromatic fluorine-containing solvents such as hexafluorobenzene; and the like can be mentioned. The preferred specific example of a good solvent is 1,1,1,2,3,4,4,5,5,5-decafluoro-3-methoxy-2-(trifluoromethyl)pentane ($C_2F_5CF(OCH_3)C_3F_7$, manufactured by 3M Japan Ltd. Ltd., Novec 7300).

The good solvent is preferably a fluorine-containing solvent; more preferably an aliphatic fluorine-containing solvent having a hydrogen atom in a molecule, such as a hydrofluorocarbon, a hydrofluoroether, a hydrochlorofluorocarbon, and a hydrofluoroolefin; or an aromatic fluorine-containing solvent; still more preferably an aliphatic solvent having a hydrogen atom in a molecule, such as a hydrofluorocarbon, a hydrofluoroether, a hydrochlorofluorocarbon, and a hydrofluoroolefin; even more preferably a hydrofluorocarbon and a hydrofluoroether; and particularly preferably a hydrofluoroether because particles having a large bulk density and excellent handleability as a powder can be obtained. Here, the aliphatic fluorine-containing solvent having a hydrogen atom may be saturated or unsaturated, and may be linear or cyclic.

Examples of the solvent that can be a poor solvent include at least one selected from the groups consisting of a fluorine-containing solvent having a hydrogen atom in a molecule, such as 1,1,2,2-tetrafluoroethyl-2,2,2-trifluoroethyl ether, 2,2,2-trifluoroethanol, 1,1,1,3,3,3-hexafluoroisopropanol, 1,2,2,3,3,4,4-heptafluorocyclopentane, 1H, 1H-pentafluoropropanol, 1H, 1H-heptafluorobutanol, 2-perfluorobutylethanol, 4,4,4-trifluorobutanol, 1H, 1H, 3H-tetrafluoropropanol, 1 H, 1H, 5H-octafluoropropanol, 1H, 1H, 7H-dodecafluoroheptanol, 1H, 1H, 3H-hexafluorobutanol, 2,2,3,3,3-pentafluoropropyldifluoromethyl ether, 2,2,3,3,3-pentafluoropropyl-1,1,2,2-tetrafluoroethyl ether, 1,1,2,2-tetrafluoroethylethyl ether, 1,1,2,2-tetrafluoroethyl-2,2,3,3-tetrafluoropropyl ether, hexafluoroisopropylmethyl ether, 1,1,3,3,3-pentafluoro-2-trifluoromethylpropylmethyl ether, 1,1,2,3,3,3-hexafluoropropylmethyl ether, 1,1,2,3,3,3-hexafluoropropylethyl ether, and 2,2,3,4,4,4-hexafluorobutyldifluoromethyl ether; and a fluorine-free organic solvent such as hexane, heptane, toluene, acetone, methanol, ethanol, isopropanol, ethyl acetate, methyl ethyl ketone, methyl isobutyl ketone, tetrahydrofuran, chloroform, dichloromethane, dichloroethane, and trichloroethane.

The poor solvent is preferably a fluorine-containing solvent, more preferably a fluorine-containing solvent having a hydrogen atom in the molecule, and even mor preferably at least one of the groups consisting of 1,1,2,2-tetrafluoroethyl-2,2,2-trifluoroethyl ether, 2,2,2-trifluoroethanol, 1,1,1,3,3,3-hexafluoroisopropanol, and 1,2,2,3,3,4,4-heptafluorocyclopentane because a fluororesin having excellent productivity, high bulk density, and excellent handleability as a powder can be obtained. From the viewpoint of cost-efficiency, the poor solvent is preferably a fluorine-free organic solvent such as hexane, heptane, toluene, acetone, methanol, ethanol, isopropanol, ethyl acetate, methyl ethyl ketone, methyl isobutyl ketone, tetrahydrofuran, chloroform, dichloromethane, dichloroethane, and trichloroethane. Further, from the viewpoint of excellent yellow index, the poor solvent is more preferably a chlorine-free solvent, and examples thereof include hexane, heptane, toluene, acetone, methanol, ethanol, isopropanol, ethyl acetate, methyl ethyl ketone, methyl isobutyl ketone, and tetrahydrofuran.

The polymerization step (1a) is a step of performing polymerization in the presence of a good solvent b1 for the fluororesin A, and is preferably a step of solution polymerization in which the fluororesin A is dissolved in a solvent including the good solvent b1.

In the polymerization step (1a), the polymerization can also be carried out in the copresence of the poor solvent c1 for the fluororesin A in addition to the radical polymerization initiator and the good solvent b1 for the fluororesin A. The poor solvent c1 will be described hereinbelow. The advantage of carrying out the polymerization in the copresence of the poor solvent c1 is that the amount of the poor solvent used in the precipitation step described hereinbelow can be reduced. The amount of the poor solvent c1 is preferably such that the fluororesin produced by the polymerization does not precipitate in the polymerization step. As for the ratio of the good solvent b1 to the poor solvent c1, the amount of the poor solvent c1 can be in the range of 1% by weight to 50% by weight based on a total amount of the good solvent b1 and the poor solvent c1.

The polymerization step (1b) is a step of performing polymerization in the presence of the poor solvent c1 with respect to the fluororesin A to precipitate the fluororesin A. The poor solvent c1 in the polymerization step (1b) can also be water. When the poor solvent c1 is water, the process is generally called suspension polymerization in the absence of an emulsifier, and emulsion polymerization in the case where an emulsifier is present. Among these types of polymerization, from the viewpoint of lowering the haze of the heat-press molded product, it is preferable that the poor solvent c1 dissolve the monomer represented by the general formula (4), and it is more preferably that precipitation polymerization be performed. Here, the precipitation polymerization means a polymerization performed in a solvent that dissolves a monomer and precipitates a polymer.

The poor solvent c1 is preferably a solvent that precipitates the fluororesin A dissolved in the good solvent b1 at a polymerization temperature (for example, 30° C. to 70° C.). In the poor solvent c1, the solubility of the fluororesin A in a 20-fold amount of the solvent is preferably less than 20% by weight, more preferably less than 10% by weight.

The conditions in the polymerization step (1), for example, the polymerization temperature, the polymerization time, the concentration of the radical polymerization initiator, the concentration of the monomer, the ratio of the initiator used to the monomer, the amount of the solvent used, and the like, can be determined, as appropriate, in consideration of the type of the monomer, radical polymerization initiator, solvent, and the like to be used. Examples are listed as follows.

The polymerization temperature is, for example, in the range of 30° C. to 70° C., and the polymerization time is, for example, in the range of 5 h to 96 h;
  the concentration of the radical polymerization initiator is, for example, in the range of 0.1 mol % to 5 mol % based on the monomer;
  the concentration of the monomer can be, for example, in the range of 5% by weight to 40% by weight based on the total of the monomer and the solvent. However, these numerical ranges are exemplary and are not intended to be limiting. In particular, the concentration of the monomer is determined, as appropriate, according to the type of the monomer and the type of the solvent, and also in consideration of the solubility of the produced polymer in the solvent.

From the viewpoint of reducing the haze value of the heat-press molded product, it is preferable to use a chain transfer agent or the like in combination with the monomer and the radical polymerization initiator for the polymerization. The chain transfer agent is not particularly limited, and for example, an organic compound having at least one atom selected from the groups consisting of a hydrogen atom and a chlorine atom and having 1 to 20 carbon atoms can be used. Here, the chain transfer agent represents a substance having an effect of lowering the molecular weight by being present in the system during radical polymerization of the fluororesin. Specific examples of the chain transfer agent include organic compounds having 1 to 20 carbon atoms and including a hydrogen atom, such as toluene, acetone, ethyl acetate, tetrahydrofuran, methyl ethyl ketone, methanol, ethanol, and isopropanol; and organic compounds having 1 to 20 carbon atoms and including a chlorine atom, such as chloroform, dichloromethane, tetrachloromethane, chloromethane, dichloroethane, trichloroethane, tetrachloroethane, pentachloroethane, hexachloroethane, benzyl chloride, pentafluorobenzyl chloride, and pentafluorobenzoyl chloride. Among them, from the viewpoint of enabling control of the molecular weight of the fluororesin, achieving excellent molding processability, excellent defoaming property during melting, less cracking during heating and cooling, and also high yield while suppressing the haze value of the heat-press molded product and suppressing yellowing after heating and melting, an organic compound having 1 to 20 carbon atoms and including a chlorine atom is preferable, and a more preferable compound is represented by the general formula (A).

[C11]

In the formula (A), m is an integer of 0 to 3, n is an integer of 1 to 3, p is an integer of 0 to 1, q is an integer of 0 to 1, and m+n+p+q is 4. $R^1$ and $R^2$ are each independently a hydrocarbon group having 1 to 19 carbon atoms or an oxygen atom, and the oxygen atom may form a double bond with an adjacent carbon atom. The total number of carbon atoms of $R^1$ and $R^2$ is 1 to 19, and the hydrocarbon group may have one or more atoms selected from an oxygen atom, a fluorine atom, and a chlorine atom, and may have no hydrogen atom. Further, the hydrocarbon group may be linear, branched, alicyclic or aromatic, and $R^1$ and $R^2$ may be linked to each other to form a ring having 3 to 19 carbon atoms.

Among them, from the viewpoint of enabling control of the molecular weight of the fluororesin, achieving excellent molding processability, excellent defoaming property during melting, less cracking during heating and cooling, and also high yield while suppressing the haze value of the heat-press molded product and suppressing yellowing after heating and melting, an organic compound having 1 to 20 carbon atoms and including a hydrogen atom a chlorine atom is preferable. Examples of the organic compound having 1 to 20 carbon atoms and including a hydrogen atom a chlorine atom include chloroform, dichloromethane, chloromethane, dichloroethane, trichloroethane, tetrachloroethane, pentachloroethane, benzyl chloride, pentafluorobenzyl chloride, and the like. Further, from the viewpoint of enabling control of the molecular weight of the fluororesin, achieving excellent molding processability, excellent defoaming property during melting, less cracking during heating and cooling, and also high yield while suppressing the haze value of the heat-press molded product and suppressing yellowing after heating and melting, in the organic compound having 1 to 20 carbon atoms and including a hydrogen atom a chlorine atom, the number ratio of hydrogen atoms to chlorine atoms is preferably in the range of hydrogen atoms:chlorine atoms=1:9 to 9:1, and more preferably in the range of 1:9 to 5:5. In addition, from the viewpoint of enabling control of the molecular weight of the fluororesin, achieving excellent molding processability, excellent defoaming property during melting, less cracking during heating and cooling, and also high yield while suppressing the haze value of the heat-press molded product and suppressing yellowing after heating and melting, the organic compound having 1 to 20 carbon atoms and including a hydrogen atom a chlorine atom is preferably represented by the following general formula (B) or (C), and more preferably by the general formula (B).

[C12]

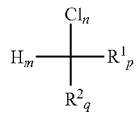

(B)

In the formula (B), m and n are independently integers of 1 to 3, p is an integer of 0 to 1, q is an integer of 0 to 1, and m+n+p+q is 4. $R^1$ and $R^2$ are each independently a hydrocarbon group having 1 to 19 carbon atoms, and the total number of carbon atoms of $R^1_p$ and $R^2_q$ is 0 to 19, and the hydrocarbon group may have one or more atoms selected from an oxygen atom, a fluorine atom, and a chlorine atom, and may have no hydrogen atom. Further, the hydrocarbon group may be linear, branched, alicyclic or aromatic, and $R^1$ and $R^2$ may be linked to each other to form a ring having 3 to 19 carbon atoms.

[C13]

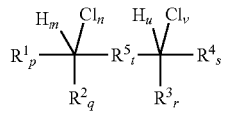

(C)

In the formula (C), m, n, u, and v are each independently an integer of 0 to 3, m+u is 1 to 5, n+v is 1 to 5, and p, q, r, s, and t are each independently an integer of 0 to 1, m+n+p+q is 3, r+s+u+v is 3, $R^1$, $R^2$, $R^3$, $R^4$, and $R^5$ are each independently a hydrocarbon group having 1 to 18 carbon atoms, the total number of carbon atoms of $R^1$, $R^2$, $R^3$, $R^4$, and $R^5$ is 0 to 18, and the hydrocarbon group may have one or more atoms selected from oxygen atom, fluorine atom, and chlorine atom, and may have no hydrogen atom. Further, the hydrocarbon group may be linear, branched, alicyclic or aromatic, and two or more groups selected from $R^1$, $R^2$, $R^3$, $R^4$, and $R^5$ may be linked to each other to form a ring having 3 to 19 carbon atoms, and there may be a plurality of such rings.

Examples of the organic compound having 1 to 20 carbon atoms and including a chlorine atom that is represented by the general formula (A) include chloroform, dichloromethane, tetrachloromethane, chloromethane, dichloroethane, trichlorethylene, tetrachloroethane, pentachloroethane, hexachloroethane, benzyl chloride, pentafluorobenzyl chloride, pentafluorobenzoyl chloride, and the like. Examples of the organic compound having 1 to 20 carbon atoms and including a hydrogen atom and a chlorine atom that is represented by the general formula (B) include chloroform, dichloromethane, chloromethane, dichloroethane, trichloroethane, tetrachloroethane, pentachloroethane, benzyl chloride, pentafluorobenzyl chloride, and the like. Examples of the organic compound having 1 to 20 carbon atoms and including a hydrogen atom and a chlorine atom that is represented by the general formula (C) include 1,1,1-trichloroethane and the like.

Furthermore, from the viewpoint of obtaining a fluororesin in which both the defoaming property during melting and resistance to crack generation are achieved and which has excellent defoaming property during melting and heat resistance, a low melt viscosity and less cracking, and further having excellent yield while suppressing the haze value of the heat-press molded product and suppressing yellowing after heating and melting, the amount of the chain transfer agent is preferably 0.01% by weight to 95% by weight, more preferably 1% by weight to 50% by weight, and still more preferably 3% by weight to 50% by weight based on the total amount of the monomer and the chain transfer agent.

Insoluble Matter Removal Step (2)

The insoluble matter removal step (2) is a step of removing insoluble matter from the mixture containing the fluororesin A including the residue unit represented by the general formula (5) obtained in the polymerization step (1) and the solvent S2 and obtaining a fluororesin A solution. The haze of the heat-melt molded product (1 mm thick) of the fluororesin obtained by providing the insoluble matter removal step can be reduced to 2% or less. In addition to a method of determining that the mixture of the fluororesin A and the solvent S2, or the fluororesin A solution includes insoluble matter, for example, by visually observing the mixture and the solvent, it is possible to perform pressure filtration of the mixture or the solvent with a PTFE membrane filter having a pore size of 0.1 μm and a prerecorded weight, wash the remaining fluororesin by repeatedly performing pressure filtration by using a good solvent such as Novec 7300 or the like from which foreign matter has been removed in advance by a filter having a pore size of 0.1 μm and introducing the good solvent, then taking out the filter, vacuum drying, and subtracting the filter weight before filtration from the filter weight to calculate the amount of residue on the filter, or evaluating by a method of observing the residue on the filter. Further, in addition to a method for determining that at least a part of the insoluble matter has been removed, for example, by visually observing the mixture or the solution, it is possible to perform pressure filtration of the fluororesin A solution with a PTFE membrane filter having a pore size of 0.1 μm and a prerecorded weight, wash the remaining fluororesin by repeatedly performing pressure filtration by using a good solvent such as Novec 7300 or the like from which foreign matter has been removed in advance by a filter having a pore size of 0.1 μm and introducing the good solvent, then taking out the filter, vacuum drying, and subtracting the filter weight before filtration from the filter weight to calculate the amount of residue on the filter, or evaluating by a method of observing the residue on the filter.

From the viewpoint that the finally obtained fluororesin A of the present invention has a reduced haze value, it is preferable that at least a part of the insoluble matter be removed from the fluororesin A solution in the insoluble matter removal step (2), and that at least a part of the insoluble matter to be removed be a residue unit represented by the general formula (1). In this case, the structure of the insoluble matter, that is, the fact that the residue unit represented by the general formula (1) is included, can be confirmed by microscopic FT-IR or the like, and can be evaluated by, for example, the following method. The operation of washing by passing 50 g of Novec 7300 through the 0.1 μm PTFE filter used for filtering the resin diluted solution is repeated 5 times, and after drying, the foreign matter on the filter is picked up, microscopic IR measurement is performed, and the determination is made by comparing with an IR chart of the fluororesin including the residue unit represented by the general formula (1). As shown in the Examples, it was confirmed that the insoluble matter removed in the insoluble matter removal step (2) was a resin including a residue unit represented by the general formula (1), and the fluororesin A of the present invention from which at least a part of the insoluble matter was removed had a reduced haze value.

Depending on the type of the polymerization step, the fluororesin A including the residue unit represented by the general formula (5) that is obtained in the polymerization step (1) can be obtained as a mixture with a different solvent. In the case of the polymerization step (1a), the fluororesin A is, for example, a good solvent b1 or a mixture of a good solvent b1 and a poor solvent c1. In this case, in the insoluble matter removal step (2), these solvents can be used as they are as the solvent S2. The good solvent b1 or the mixture of the good solvent b1 and the poor solvent c1 can be used as it is as a good solvent b2 or a mixed solvent of a good solvent b2 and a poor solvent c2. Alternatively, the solvent S2 can be obtained by further mixing other solvents.

In the case of the polymerization step (1b), the fluororesin A is obtained as a precipitate. The solvent S2 can be a mixture containing a good solvent b2 or a mixed solvent of a good solvent b2 and a poor solvent c2 after recovering the precipitate of the fluororesin A obtained in the polymerization step (1b) by solid-liquid separation or the like, washing and/or drying as necessary.

When the solvent S2 is a mixed solvent, the amount of the poor solvent c2 is preferably such that insoluble matter is copresent but the fluororesin does not precipitate in consideration of the concentration of the fluororesin A, and the ratio of the good solvent b2 and the poor solvent c2 can be such that the amount of the poor solvent c2 is, for example, 1% by weight to 50% by weight based on the total amount of the good solvent b2 and the poor solvent c2.

In any case, from the viewpoint of effectively reducing the haze in the heat-melt molded product of the fluororesin, the concentration of the fluororesin A of the mixture of the fluororesin A and the solvent S2 supplied to the insoluble matter removal step is preferably 1% by weight to 40% by weight, and more preferably 5% by weight to 30% by weight.

The insoluble matter removal step (2) can be, for example, any of the following steps (2a) or (2b).

(2a) A step of filtering a mixture containing the fluororesin A and the solvent S2 with a filter to remove insoluble matter, and (2b) a step of centrifuging a mixture containing the fluororesin A and the solvent S2 to remove insoluble matter.

In the insoluble matter removal step (2a), the insoluble matter is removed by filtering the mixture containing the fluororesin A and the solvent S2 with a filter. The filtration method is not particularly limited, and examples thereof include pressure filtration, vacuum filtration, and centrifugal filtration. The particulate matter removal performance of the filter used is not limited, but the 99% captured particle diameter of the filter is preferably 10 μm or less, more preferably 5 μm or less, even more preferably 1 μm or less, still more preferably 0.5 μm or less, and even more preferably 0.2 μm or less, and still more preferably 0.1 μm or less because the haze in the heat-melt molded product of the fluororesin A is effectively reduced. Here, the 99% captured particle diameter represents the particle diameter of particles that the filter can capture at 99% or more, and is described in the filter catalog, technical data, or the like, and can also be found by examining the capture rate of standard particles having a known particle diameter.

Examples of the filter material to be used include resins such as polypropylene, polyethylene, polyethylene terephthalate, nylon, PTFE (polytetrafluoroethylene), PES (polyether sulfone), cellulose mixed ester, cellulose acetate, polycarbonates, cellulose, nylon, and polyamides; ceramics such as silica fibers and glass fibers; metals such as stainless steel and Hastelloy; and the like. Among them, a filter made of PTFE is preferred because the haze of fluororesin A in a heat-melt molded product can be effectively reduced. Further, the filter may be hydrophobic or hydrophilic.

Examples of the type of filter to be used include a depth filter, a screen filter and the like, and examples of the screen filter include a mesh filter, a membrane filter, and the like. Among them, it is preferable to use a screen filter, more preferably a membrane filter, and even more preferably a PTFE membrane filter because haze in a heat-melt molded product of fluororesin A can be effectively reduced. A depth filter is a filter that captures particles inside the filter, and a screen filter is a filter that captures particles on the surface of the filter. A membrane filter is one kind of screen filters. Further, a plurality of types of filters to be used may be combined, because excellent filterability can be obtained. For example, a combination of a depth filter and a screen filter and a combination of screen filters having different capture particle diameters can be used. Where another filter such as a depth filter is combined with a screen filter, or screen filters having different captured particle diameter are combined, excellent filterability can be obtained. Therefore, the 99% captured particle diameter of the filter combined with the screen filter is preferably 1 μm to 10 μm.

It is preferable to use a screen filter having a pore diameter of 10 μm or less, more preferably to use a screen filter having a pore diameter of 5 μm or less, even more preferably to use a screen filter having a pore diameter of 1 μm or less, still more preferably to use a screen filter having a pore diameter of 0.5 μm or less, and further preferably to use a screen filter having a pore diameter of 0.2 μm or less because the haze of the fluororesin A in the heat-melt molded product can be effectively reduced. Generally, where the pore size of the membrane filter is C μm, the 99% captured particle diameter is less than C μm, and depending on the product, 99.99% or more of C μm particles are captured.

In the insoluble matter removal step (2b), a mixture containing the fluororesin A and the solvent S2 is subjected to centrifugation to remove the insoluble matter. A centrifugation method is not particularly limited. For example, the insoluble matter can be removed by a method of placing a mixture containing the fluororesin A and the solvent S2 in a container, and applying a centrifugal force to the container to settle the insoluble matter and separate the solution. The centrifugation method may be of a batch type, a continuous type, or an intermediate type between the batch type and the continuous type.

Precipitation Step (3)

In the precipitation step (3), the fluororesin A is precipitated from the fluororesin A solution obtained in the insoluble matter removal step. As the solvent S3 of the fluororesin A solution, the solvent S2 used for removing the insoluble matter in the insoluble matter removal step (2) can be used as it is, or a solvent of a different kind and composition can be used depending on the method.

The method for precipitating the polymer from the fluororesin A solution is not particularly limited, and the precipitation step (3) can be, for example, any of the following steps (3a), (3b), (3c), and (3d).
- (3a) A step of lowering the temperature of the fluororesin A solution to precipitate the fluororesin A,
- (3b) a step of precipitating the fluororesin A by adding the fluororesin A solution to the poor solvent c3 for the fluororesin A,
- (3c) a step of precipitating fluororesin A by adding a poor solvent c3 for the fluororesin A solution to the fluororesin A solution, and
- (3d) a step of precipitating the fluororesin A by volatilizing the solvent from the fluororesin A solution.

The precipitation step (3a) is a step of lowering the temperature of the fluororesin A solution to precipitate the fluororesin A. As the solvent S3 of the fluororesin A solution, the solvent S2 used for removing the insoluble matter in the insoluble matter removal step (2) can be used as it is, or a solvent of a different kind and composition can be used depending on the method. The good solvent b2 used for removing the insoluble matter in the insoluble matter removal step (2) or a mixed solvent of the good solvent b2 and the poor solvent c2 may be used as it is as the solvent in the precipitation step (3a). That is, the good solvent b2 or the mixed solvent of the good solvent b2 and the poor solvent c2 can be taken as the good solvent b3 for the fluororesin A or the mixed solvent of the good solvent b3 for the fluororesin A and the poor solvent c3 for the fluororesin A. From the viewpoint of obtaining particles having excellent productivity and excellent handleability as a powder, the concentration of the fluororesin A in the fluororesin A solution is preferably 1% by weight to 40% by weight, more preferably 1% by weight to 30% by weight, and even more preferably 2% by weight to 20% by weight. From the viewpoint of obtaining particles having excellent productivity and excellent handleability as a powder, it is preferable that the solvent S3 to be used in the precipitation step be a mixed solvent of a good solvent b3 and a poor solvent c3. When the solvent S3 to be used in the precipitation step is a mixed solvent of a good solvent b3 and a poor solvent c3, from the viewpoint of obtaining particles having excellent productivity and excellent handleability as a powder and reducing the coloring of the heat-melted product, the weight ratio of the good solvent b3 and the poor solvent c3 is preferably 10:90 to 99:1, more preferably 20:80 to 95:5, even more preferably 30:70 to 95:5, still more preferably 30:70 to 90:10 and even more preferably 30:70 to 80:20.

In the precipitation step (3a), the solution temperature $T_1$ before lowering the temperature is, for example, preferably 30° C. or higher, more preferably 40° C. or higher, and still more preferably 50° C. or higher, and assuming that the solution temperature after lowering the temperature is $T_2$, $T_1-T_2$ can be preferably 5° C. or higher, more preferably 10° C. or higher, even more preferably 15° C. or higher, still more preferably 20° C. or higher. As a result, the fluororesin A is sufficiently precipitated.

In the precipitation step (3a), the temperature is preferably lowered in 1 min to 600 min, and the temperature is more preferably lowered in 5 min to 300 min because the productivity is excellent, the handleability as a powder is excellent, and the coloring of the heat-melted product is reduced.

In the precipitation step (3a), the temperature is preferably lowered at a rate of 0.05° C. to 20° C. per minute, and the temperature is more preferably lowered at a rate of 0.1° C. to 5° C. per minute because particles having excellent productivity and excellent handleability as a powder can be obtained.

The precipitation step (3b) is a step of precipitating the fluororesin A by adding the fluororesin A solution to the poor solvent c3 for the fluororesin A, and the precipitation step (3c) is a step of precipitating the fluororesin A solution by adding the poor solvent c3 for the fluororesin A solution to the fluororesin A solution. The solvent S3 of the fluororesin A solution in the precipitation steps (3b) and (3c) may be the solvent S2 used for removing the insoluble matter in the insoluble matter removal step (2). However, from the viewpoint that the fluororesin A could be easily precipitated by mixing with the poor solvent c3, the solvent S2 used for removing the insoluble matter in the insoluble matter removal step (2) is preferably a mixed solvent of a good solvent b2 and a poor solvent c2. From the viewpoint that the fluororesin A be easily precipitated and the coloration of the heat-molded product be reduced, the precipitation step (3b) of precipitating the fluororesin A by adding the fluororesin A solution to the poor solvent c3 for the fluororesin A is preferable. Meanwhile, from the viewpoint of excellent handleability as a powder, the precipitation step (3c) of precipitating the fluororesin A by adding the poor solvent c3 for the fluororesin A solution to the fluororesin A solution is preferable.

In any of the steps, the weight ratio of the good solvent: poor solvent after mixing the poor solvent c3 is preferably in the range of 10:90 to 90:10, more preferably 20:80 to 80:20, even more preferably 30:70 to 70:30, and still more preferably 30:70 to 60:40 because particles having excellent productivity and excellent handleability as a powder can be obtained and adhesion of particles to each other can be prevented.

In the precipitation step (3d), the fluororesin A is precipitated by volatilizing the solvent S3 from the fluororesin A solution. From the viewpoint of removing the solvent S3 by volatilization, the solvent S3 can be a solvent having a relatively low boiling point. The volatilization operation of the solvent S3 can be carried out by a known method, for example, a method of volatilizing the solvent using a thin film evaporator such as EXEVA, a method of passing the solvent through a heated flash tank to volatilize the solvent, a method of volatilizing the solvent by heating a solution with an extruder by using a volatilization extrusion device, a method of dispersing a fluororesin A solution in a solvent that is immiscible with the fluororesin A solution, such as water, and heating or introducing steam to volatilize the solvent (when steam is introduced, it is generally called steam stripping), and a method of heating the fluororesin A solution containing a good solvent having a low boiling point and a poor solvent having a high boiling point to volatilize the good solvent having a low boiling point, thereby precipitating the fluororesin A, and a plurality of methods may be combined. Further, after removing the solvent by these methods, the fluororesin A may be processed into pellets by a pelletizer or the like.

The precipitation steps (3a) to (3d) can also be used in combination as appropriate. For example, it is also possible to subject the fluororesin A solution obtained in the insoluble matter removal step to the precipitation step (3b) or (3c), further subject the remaining fluororesin A solution to the precipitation step (3a) or (3d), and then recover the remaining fluororesin A.

In the precipitation step, it is preferable to stir the fluororesin A solution, for example, to stir with a stirring blade, stir with vibration, and the like because particles having excellent productivity and handleability as a powder can be obtained. In any of the precipitation steps (3a) to (3d), it is preferable to stir the solution when the resin is precipitated.

In the precipitation step, it is preferable that the particulate solid matter be precipitated by lowering the temperature while stirring so that the Pv value, which is the value of the stirrer motor power per unit stirring capacity, be 0.05 kW/m³ to 50 kW/m³, and the Pv value is more preferably 0.2 kW/m³ to 50 kW/m³, even more preferably 0.5 kW/m³ to 30 kW/m³, and particularly preferably 0.5 kW/m³ to 10 kW/m³ because particles having excellent productivity and handleability as a powder can be obtained. Here, the Pv value (kW/m³) can be calculated by the following formula (10).

[Math. 1]

$$Pv \text{ value} = Np \times \rho \times \left(\frac{n}{60}\right)^3 \times \left(\frac{d}{1000}\right)^5 / V \quad (10)$$

(Here, Np: power factor, ρ: solution density (kg/m³), n: rotation speed of stirring blade (rpm), d: diameter of stirring blade (mm), V: solution amount (L).)

Np in the formula (10) is a dimensionless number called a power factor, which changes depending on the shape of the stirring blade. This Np can be obtained from known publications such as "*Kagaku Sochi* (Chemical apparatuses), August 1995, pp. 71-79" and "Shinko Pfaudler Technical Report, vol. 28, No. 8 (October 1984), pp. 13-16". At this time, where the ratio b/d of the blade width b and the diameter d of the stirring blade is different from that of the stirring blade described in the publications, the calculation can be performed by the following formula (11).

Actual $Np=Np\times$(actual $b/d$)/($b/d$ described in the literature) (11)

(Here, Np: power factor, b: blade width of the stirring blade (mm), d: diameter of the stirring blade (mm).)

In the first aspect of the present invention, the combination of the polymerization step (1), the insoluble matter removal step (2) and the precipitation step (3) is not particularly limited, but from the viewpoint that a fluororesin with few impurities could be obtained and the coloring of the heat-melted product be reduced by including a step of precipitating the fluororesin as particles, for example, it is preferable that the polymerization step (1) be step (1a) or (1c), and the precipitation step (3) be step (3a), or (3b) or (3c), and it is also preferable that the polymerization step (1) be step (1b), and the precipitation step (3) be step (3a), (3b), (3c), or (3d). It is more preferable that the polymerization step (1) be step (1a), the insoluble matter removal step (2) be step (2a), and the precipitation step (3) be step (3a) or (3b) or (3c), and it is also preferable that the polymerization step (1) be step (1b), the insoluble matter removal step (2) be step (2a), and the precipitation step (3) be step (3a), (3b), (3c) or (3d). It is preferable that the combination of the polymerization step (1) and the precipitation step (3) be the above combination because the particulate fluororesin A can be obtained in any of the steps, and a step of washing and the like the particulate fluororesin A can be further performed, so that the fluororesin having a small coloration of the heat-melted product be easily obtained. Further, the precipitation step is preferably step (3a) or (3c) because particles having a high bulk density and excellent handleability as a powder can be obtained. Further, from the viewpoint that the torque is unlikely to increase in the particle precipitation step and the productivity is excellent, the precipitation step is preferably step (3a).

It is preferable to carry out the poor solvent addition step (4) of adding the poor solvent c4 because in the fluororesin A solution which was obtained in the precipitation step (3) and in which the resin was precipitated, mutual adhesion of the obtained resin particles is prevented, and a resin having excellent handleability as a powder can be obtained. As for the amount of the poor solvent c4 in the poor solvent addition step (4), it is preferable that the weight of the poor solvent c4 to be added be 0.1 times or more, and it is more preferable that the weight of the poor solvent c4 be 0.5 times or more or 1 time or more the weight of the fluororesin A-containing solution obtained in the precipitation step because a resin which has excellent productivity and excellent handleability as a powder and in which adhesion of particles to each other is prevented can be obtained.

In the first aspect of the present invention, any other step may be added, but after the precipitation step (3) or the poor solvent addition step (4), the separation step (5) for taking out the solid matter by solid-liquid separation may be included. The solid-liquid separation method is not particularly limited, and examples thereof include pressure filtration, vacuum filtration, centrifugal separation, centrifugal filtration and the like. The size of the filter used is not limited, and examples thereof include a filter having a captured particle diameter of 30 μm or less and the like. The material of the filter used is not limited, and examples thereof include polypropylene, polyethylene, polyethylene terephthalate, nylon, PTFE, PES, and the like.

In the first aspect of the present invention, any other step may be added, and a washing step of washing the particles of the fluororesin A and/or a drying step of drying may be included. In the washing step (6), a poor solvent c6 is preferably used, and the poor solvent c6 is an organic solvent that precipitates the fluororesin A preferably at 25° C. The drying method is not particularly limited, and examples thereof include vacuum drying, drying under reduced pressure, drying under normal pressure, blast drying, shaking drying, warm air drying, heat drying, and the like.

In the first aspect of the present invention, the separation step (5) of separating the fluororesin A from the solution in which the fluororesin A obtained in the precipitation step (3) is precipitated or the solution obtained by adding the poor solvent c4 in the poor solvent addition step (4), and the washing step (6) of washing the separated fluororesin A with the poor solvent c6 are preferably further included. As a result, particles having a more excellent yellow index can be obtained.

Further, it is preferable to use a solvent filtered by a filter having a 99% captured particle diameter of 5 μm or less or a screen filter having a pore diameter of 5 μm or less as the poor solvent c6 because the haze in the heat-melt molded product can be effectively reduced.

The second aspect of the present invention is as follows.

A method for producing fluororesin particles including a fluorine-containing aliphatic ring structure, the method including a precipitation step of lowering a solution temperature of a fluororesin (A) solution in which a fluororesin (A) including a fluorine-containing aliphatic ring structure is dissolved in a solvent (B) to precipitate particles of the fluororesin (A).

The structure of the fluororesin (hereinafter referred to as "fluororesin (A)") containing a fluorine-containing aliphatic ring structure is not limited as long as the structure includes a fluorine-containing aliphatic ring structure, and such structure can be exemplified by at least one selected from the groups consisting of a compound including a residue unit represented by the following general formula (1), cyclized polymers and copolymers of perfluoro(4-vinyloxy-1-butene), polymers and copolymers of perfluoro(2,2-dimethyl-1,3-dioxole), a copolymer of perfluoro(2,2-dimethyl-1,3-dioxols) and tetrafluoroethylene, polymers and copolymers of 2,2,4-trifluoro-5-trifluoromethoxy-1,3-dioxole, and a copolymer of 2,2,4-trifluoro-5-trifluoromethoxy-1,3-dioxole and tetrafluoroethylene.

[C14]

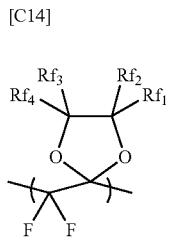

(1)

In the formula (1), $Rf_1$, $Rf_2$, $Rf_3$ and $Rf_4$ each independently represent a fluorine atom or one of the groups consisting of a linear, branched, or cyclic perfluoroalkyl group having 1 to 7 carbon atoms that may have an ethereal oxygen atom. Further, $Rf_1$, $Rf_2$, $Rf_3$ and $Rf_4$ may be linked to each other to form a ring having 4 or more and 8 or less carbon atoms, and the ring may include an ethereal oxygen atom. More specifically, $Rf_1$, $Rf_2$, $Rf_3$ and $Rf_4$ in the formula (1) each independently represent one of the groups consisting of a fluorine atom, a linear perfluoroalkyl group having 1 to 7 carbon atoms, a branched perfluoroalkyl group having 3 to 7 carbon atoms, and a cyclic perfluoroalkyl group having 3 to 7 carbon atoms, the perfluoroalkyl group may have an ethereal oxygen atom, and $Rf_1$, $Rf_2$, $Rf_3$ and $Rf_4$ may be linked to each other to form a ring having 4 or more and 8 or less carbon atoms, and the ring may include an ethereal oxygen atom.

The $Rf_1$, $Rf_2$, $Rf_3$, and $Rf_4$ groups in the residue unit represented by the general formula (1) in the second aspect of the present invention each independently represent a fluorine atom or one of the groups consisting of a linear, branched, or cyclic perfluoroalkyl group having 1 to 7 carbon atoms. Further, $Rf_1$, $Rf_2$, $Rf_3$ and $Rf_4$ may be linked to each other to form a ring having 4 or more and 8 or less carbon atoms. Examples of the linear perfluoroalkyl group having 1 to 7 carbon atoms include a trifluoromethyl group, a pentafluoroethyl group, a heptafluoropropyl group, a nonafluorobutyl group, an undecafluoropentyl group, a tridecafluorohexyl group, a pentadecafluoroheptyl group, and the like, examples of the branched perfluoroalkyl group having 3 to 7 carbon atoms include a heptafluoroisopropyl group, a nonafluoroisobutyl group, a nonafluoro sec-butyl group, a nonafluoro tert-butyl group, and the like, and examples of the cyclic perfluoroalkyl group having 3 to 7 carbon atoms include a heptafluorocyclopropyl group, a nonafluorocyclobutyl group, a tridecafluorocyclohexyl group, and the like. Examples of the linear perfluoroalkyl group that has 1 to 7 carbon atoms and may have an ethereal oxygen atom include a —$CF_2OCF_3$ group, a —$(CF_2)_2OCF_3$ group, and a —$(CF_2)_2OCF_2CF_3$ group, and examples of the linear perfluoroalkyl group that has 3 to 7 carbon atoms and may have an ethereal oxygen atom include a 2-(2,3,3,4,4,5,5,6,6-decafluoro)-pyrinyl group, a 4-(2,3,3,4,4,5,5,6,6-decafluoro)-pyrinyl group, a 2-(2,3,3,4,4,5,5-heptafluoro)-furanyl group, and the like.

In order to obtain excellent heat resistance, it is preferable that at least one of $Rf_1$, $Rf_2$, $Rf_3$, and $Rf_4$ be a linear, branched, or cyclic perfluoroalkyl group having 1 to 7 carbon atoms.

Specific examples of the residue unit represented by the general formula (1) include the following residue units.

[C15]

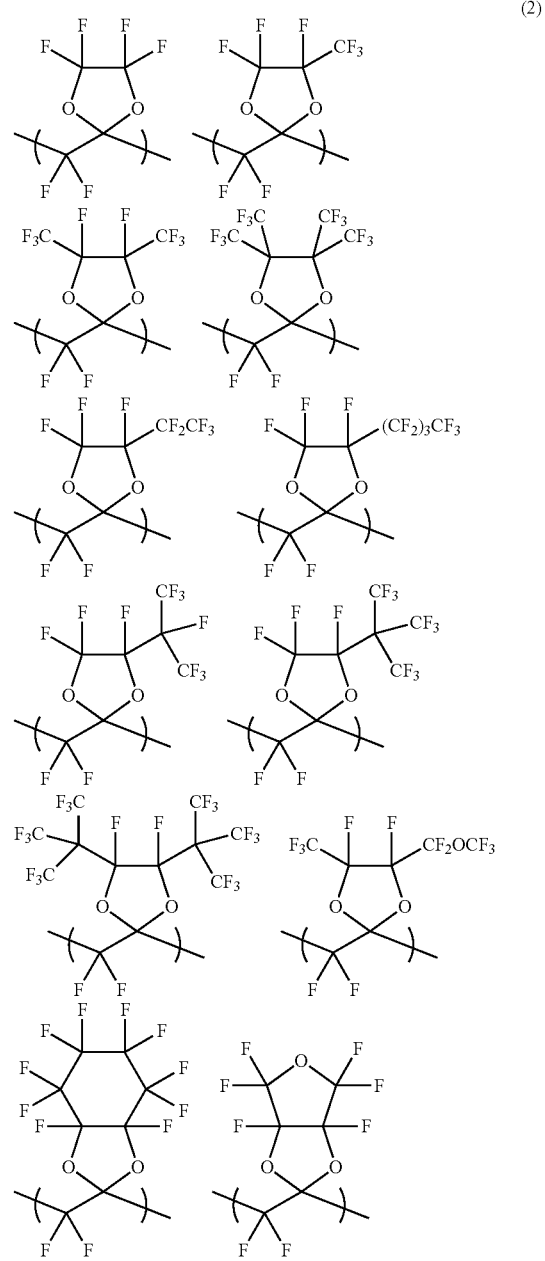

(2)

Among them, a fluororesin including a perfluoro(4-methyl-2-methylene-1,3-dioxolane) residue unit represented by the following general formula (3) is preferable because a fluororesin having excellent heat resistance can be obtained.

The fluororesin (A) according to the second aspect of the present invention may include other monomer residue units, and examples of the other monomer residue units include tetrafluoroethylene (TFE), hexafluoropropylene (HFP), chlorotrifluoroethylene (CTFE), trifluoroethylene, hexafluoroisobutylene, perfluoroalkylethylenes, fluorovinyl ethers, and the like.

[C16]

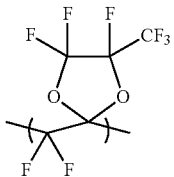

(3)

The solvent (B) in the second aspect of the present invention may be any solvent that dissolves the fluororesin (A) at a temperature before lowering the temperature in the precipitation step, and that causes the fluororesin (A) to precipitate when the temperature is lowered in the precipitation step.

Here, in the second aspect of the present invention, the fact that the fluororesin (A) is dissolved in the solvent (B) means that at least a part of the fluororesin (A) is dissolved in the solvent (B), and the dissolution can be confirmed by, for example, a method of visually confirming whether the dissolution took place, and also a method of checking whether solid precipitation occurs when the fluororesin (A) solution is added to a poor solvent in an amount four times or more the amount of the fluororesin (A) solution, and a method of determining that at least a part of the fluororesin (A) is dissolved in the fluororesin (A) solution before addition to the poor solvent when solid precipitation has occurred. The state of the solution may be any state in which stirring can be performed, and examples thereof include a uniform liquid state, a cloudy liquid state, and a gel state.

The solubility of the fluororesin (A) in the solvent (B) at a temperature before lowering the temperature in the precipitation step is preferably 50% by weight or more, more preferably 70% by weight or more, and particularly preferably 80% by weight or more because particles having excellent productivity and excellent handleability as a powder can be obtained.

The solubility of the fluororesin (A) in the solvent (B) at a temperature after lowering the temperature in the particle precipitation step is preferably less than 50% by weight, more preferably less than 30% by weight, and particularly preferably less than 20% by weight because particles excellent in productivity and excellent in handleability as a powder can be obtained.

The solvent (B) in the second aspect of the present invention may be any solvent that dissolves the fluororesin (A) at a temperature before lowering the temperature in the precipitation step, and that causes the fluororesin (A) to precipitate when the temperature is lowered in the precipitation step, and the component may be a single solvent or a composition containing a plurality of solvents. It is preferable that the solvent (B) be a composition containing a good solvent (b-1) for the fluororesin (A) and a poor solvent (b-2) for the fluororesin (A) because particles having excellent productivity and excellent handleability as a powder can be obtained.

Here, in the second aspect of the present invention, the good solvent (b-1) is an organic solvent capable of dissolving the fluororesin (A) at a temperature before lowering the temperature in the precipitation step, and is preferably an organic solvent capable of dissolving the resin at 50° C.

For example, an organic solvent that dissolves a powdery or fluffy fluororesin (A) after the resin has been immersed in the solvent having the same temperature as the resin solution used in the precipitation step for 5 h or more can be determined as a good solvent. Here, the temperature of the resin solution supplied to the precipitation step refers to the temperature before lowering the temperature.

The good solvent (b-1) preferably has a solubility with respect to the fluororesin (A) of 80% by weight or more, and more preferably 90% by weight or more.

The good solvent (b-1) is preferably at least one of the groups consisting of perfluorocarbons, hydrochlorofluorocarbons, hydrofluorocarbons, hydrofluoroethers, hydrofluoroolefins, and aromatic fluorine compound, and more preferably at least one of the groups consisting of perfluorohexane, perfluoro-N-methylmorpholine, perfluoro-N-propylmorpholine, perfluorotriethylamine, perfluoromethyldibutylamine, perfluorotributylamine, $CF_3CF_2CHCl_2$, $CF_3CHFCHFCF_2CF_3$, $CF_3CF_2CF_2CF_2CF_2CF_2H$, $CF_3(CF_2)_5CH_2CH_3$, $C_4F_9OCH_3$, $C_4F_9OC_2H_5$, $C_2F_5CF(OCH_3)C_3F_7$, and hexafluorobenzene.

Examples of such solvents include perfluorocarbons such as FLUORINERT FC-5052, FC-72, FC-770, FC-3283, FC-40, FC-43 (all manufactured by 3M Japan Ltd.); hydrochlorofluorocarbons such as ASAHIKLIN AK-225 (manufactured by Asahi Glass Co., Ltd.); hydrofluorocarbons such as VERTREL XF (manufactured by Chemours-Mitsui Fluoroproducts Co, Ltd.), ASAHIKLIN AC-2000, AC-6000 (all manufactured by Asahi Glass Co., Ltd.); hydrofluoroethers such as Novec 7100, Novec 7200, and Novec 7300 (manufactured by 3M Japan Ltd.); hydrofluoroolefins such as OPTEON $SF_{10}$ (manufactured by Chemours-Mitsui Fluoroproducts Co, Ltd.); aromatic fluorine-containing solvents such as hexafluorobenzene; and the like. The good solvent (b-1) is preferably a fluorine-containing solvent; more preferably an aliphatic fluorine-containing solvent having a hydrogen atom in a molecule, such as a hydrofluorocarbon, a hydrofluoroether, a hydrochlorofluorocarbon, and a hydrofluoroolefin; or an aromatic fluorine-containing solvent; still more preferably at least one of the groups consisting of hydrofluorocarbon, hydrofluoroether, and aromatic fluorine-containing solvents, and particularly preferably a hydrofluoroether. Here, the aliphatic fluorine-containing solvent having a hydrogen atom may be saturated or unsaturated, and may be linear or cyclic.

Here, in the second aspect of the present invention, the poor solvent (b-2) is an organic solvent that precipitates the fluororesin (A) at a temperature after the temperature is lowered in the precipitation step, preferably an organic solvent that precipitates the fluororesin (A) at 25° C. When the good solvent (b-1) in which the fluororesin (A) is dissolved is added dropwise to the organic solvent, the organic solvent in which the fluororesin (A) is precipitated can be determined as a poor solvent.

The solubility of the poor solvent (b-2) with respect to the fluororesin (A) is preferably less than 20% by weight, more preferably less than 10% by weight.

Examples of the poor solvent (b-2) include at least one selected from the groups consisting of fluorine-containing solvents having a hydrogen atom in a molecule, such as 1,1,2,2-tetrafluoroethyl-2,2,2-trifluoroethyl ether, 2,2,2-trifluoroethanol, 1,1,1,3,3,3-hexafluoroisopropanol, and 1,2,2,3,3,4,4-heptafluorocyclopentane; fluorine-containing alcohols such as trifluoroethanol; and fluorine-free organic solvents such as hexane, toluene, acetone, methanol, ethyl acetate, and chloroform. The organic solvent is preferably a fluorine-containing solvent, more preferably a fluorine-containing solvent having a hydrogen atom in the molecule, and even more preferably at least one of the groups consisting of 1,1,2,2-tetrafluoroethyl-2,2,2-trifluoroethyl ether, 2,2,2-trifluoroethanol, 1,1,1,3,3,3-hexafluoroisopropanol, and 1,2,2,3,3,4,4-heptafluorocyclopentane because particles having excellent productivity and excellent handleability as a powder can be obtained.

As for the ratio of the good solvent (b-1) to the poor solvent (b-2) in the solvent (B) used in the precipitation step, the weight ratio of good solvent:poor solvent is preferably 10:90 to 99:1, more preferably 20:80 to 95:5, even more preferably 30:70 to 95:5, still more preferably 30:70 to 90:10, and particularly preferably 30:70 to 80:20 because particles having excellent productivity and excellent handleability as a powder can be obtained.

The concentration of the fluororesin (A) solution in the precipitation step is preferably 1% by weight to 30% by weight, preferably 2% by weight to 20% by weight, and particularly preferably 5% by weight to 15% by weight because particles having excellent productivity and excellent handleability as a powder can be obtained.

In the precipitation step, the temperature of the fluororesin (A) solution used in the precipitation step, that is, the solution temperature before lowering the temperature (hereinafter referred to as "$T_1$") is preferably 30° C. or higher, and more preferably 40° C. or higher. Meanwhile, in the precipitation step, the solution temperature after lowering the temperature (hereinafter referred to as "$T_2$") is preferably 30° C. or lower, and more preferably 25° C. or lower. As a result, the fluororesin (A) is sufficiently precipitated.

Further, $T_1$-$T_2$ is preferably 5° C. or higher, and more preferably 10° C. or higher because particles having excellent productivity and excellent handleability as a powder can be obtained.

In the precipitation step, the temperature is preferably lowered in 1 min to 600 min, and the temperature is more preferably lowered in 5 min to 300 min because particles having excellent productivity and excellent handleability as a powder can be obtained.

In the precipitation step, the temperature is preferably lowered at a rate of 0.05° C. to 20° C. per minute, and the temperature is more preferably lowered at a rate of 0.1° C. to 5° C. per minute because particles having excellent productivity and excellent handleability as a powder can be obtained.

In the precipitation step, stirring is preferable because particles having excellent productivity and excellent handleability as a powder can be obtained, and examples thereof include stirring by a stirring blade and stirring by vibration.

In the precipitation step, it is preferable that the particulate solid matter be precipitated by lowering the temperature while stirring so that that the Pv value, which is the value of the stirrer motor power per unit stirring capacity, be 0.2 kW/m³ to 50 kW/m³, and the Pv value is more preferably 0.2 kW/m³ to 30 kW/m³, even more preferably 0.5 kW/m³ to 30 kW/m³, and particularly preferably 0.5 kW/m³ to 10 kW/m³ because particles having excellent productivity and handleability as a powder can be obtained. Here, the Pv value (kW/m³) can be calculated by the following formula (5).

[Math. 2]

$$Pv \text{ value} = Np \times \rho \times \left(\frac{n}{60}\right)^3 \times \left(\frac{d}{1000}\right)^5 / V \quad (5)$$

(Here, Np: power factor, ρ: solution density (kg/m³), n: rotation speed of stirring blade (rpm), d: diameter of stirring blade (mm), V: solution amount (L).)

Np in the formula (5) is a dimensionless number called a power factor, which changes depending on the shape of the stirring blade. This Np can be obtained from known publications such as "*Kagaku Sochi* (Chemical apparatuses), August 1995, pp. 71-79" and "Shinko Pfaudler Technical Report, vol. 28, No. 8 (October 1984), pp. 13-16". At this time, where the ratio b/d of the blade width b and the diameter d of the stirring blade is different from that of the stirring blade described in the publications, the calculation can be performed by the following formula (6).

Actual $Np$=$Np$×(actual $b/d$)/($b/d$ described in the literature) (6)

(Here, Np: power factor, b: blade width of the stirring blade (mm), d: diameter of the stirring blade (mm).)

It is preferable to carry out the poor solvent addition step of adding the poor solvent (b-2) because in the fluororesin (A) solution which was obtained in the precipitation step and in which the resin was precipitated, mutual adhesion of the obtained particles is prevented, and particles having excellent handleability can be obtained. As for the amount of the poor solvent (b-2) in the poor solvent addition step, it is preferable that the weight of the poor solvent added be 0.1 times or more, and it is more preferable that the weight of the poor solvent added be 0.5 times or more or 1 time or more the weight of the fluororesin (A) solution obtained in the precipitation step because particles having excellent productivity and excellent handleability as a powder can be obtained and adhesion of particles to each other is prevented.

The weight ratio of good solvent : bad solvent after the addition of the poor solvent (b-2) in the poor solvent addition step is preferably 10:90 to 90:10, more preferably 20:80 to 80:20, even more preferably 30:70 to 70:30, and particularly preferably 30:70 to 60:40 because particles which have excellent productivity and excellent handleability as a powder and which are prevented from adhering to each other can be obtained.

In the second aspect of the present invention, any other step may be added, but in order to ensure the strict cleanliness required in the optical and electronic fields, it is preferable to have a filtration step of removing foreign matter by filtering the fluororesin (A) solution before the precipitation step. The filtration method is not particularly limited, and examples thereof include pressure filtration, vacuum filtration, and centrifugal filtration. The size of the filter used is not limited, and examples thereof include a filter having a captured particle diameter of 1 μm or less. The material of the filter used is not limited, and examples thereof include polypropylene, polyethylene, polyethylene terephthalate, nylon, PTFE, PES, and the like.

In the second aspect of the present invention, any other step may be added, and a separation step of taking out the particulate solid matter by solid-liquid separation may be included after the precipitation step or the poor solvent addition step. The solid-liquid separation method is not particularly limited, and examples thereof include pressure filtration, vacuum filtration, centrifugation, and centrifugation. The size of the filter used is not limited, and examples thereof include a filter having a supplementary particle diameter of 10 μm or less. The material of the filter used is not limited, and examples thereof include polypropylene, polyethylene, polyethylene terephthalate, nylon, PTFE, and PES.

In the second aspect of the present invention, any other step may be added, and a drying step of drying the particles of the fluororesin (A) may be included. The drying method is not particularly limited, and examples thereof include vacuum drying, drying under reduced pressure, drying under normal pressure, blast drying, shaking drying, warm air drying, and heat drying.

The weight average molecular weight Mw of the fluororesin (A) in the second aspect of the present invention may be any value, and for example, the weight average molecular weight Mw measured using gel permission chromatography (GPC) is 10,000 to 1,000,000.

The fluororesin (A) in the second aspect of the present invention may be produced by any method, and for example, can be obtained by polymerizing the monomer of the following general formula (4) in the presence of a radical polymerization initiator.

[C17]

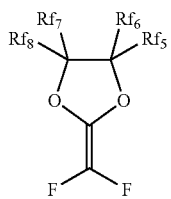

(4)

(In the formula (4), $Rf_5$, $Rf_6$, $Rf_7$, and $Rf_8$ are each independently a fluorine atom or one of the groups consisting of a linear, branched, or cyclic perfluoroalkyl group that has 1 to 7 carbon atoms and may have an ethereal oxygen atom. Further, $Rf_5$, $Rf_6$, $Rf_7$ and $R_8$ may be linked to each other to form a ring having 4 or more and 8 or less carbon atoms.)

Examples of the radical polymerization initiator for performing radical polymerization include organic peroxides such as benzoyl peroxide, lauryl peroxide, octanoyl peroxide, acetyl peroxide, di-tetr-butyl peroxide, tetr-butylcumyl peroxide, and dicumyl peroxide, tetr-butyl peroxyacetate, perfluoro(di-tetr-butyl peroxide), bis(2,3,4,5,6-pentafluorobenzoyl) peroxide, tetr-butyl peroxybenzoate, and tetr-butyl perpivalate; azo-based initiators such as 2,2'-azobis(2,4-dimethylvaleronitrile), 2,2'-azobis(2-butyronitrile), 2,2'-azobisisobutyronitrile, dimethyl-2,2'-azobisisobutyrate, and 1,1'-azobis (cyclohexane-1-carbonitrile); and the like.

In the second aspect of the present invention, the fluororesin (A) may be produced by any method, and examples thereof include methods such as bulk polymerization and solution polymerization.

In the second aspect of the present invention, the fluororesin (A) solution may be prepared by any method, but it is preferable that the fluororesin (A) solution be prepared by a solution preparation step in which the fluororesin (A) solution is obtained by method including either a method of dissolving the solid matter of the fluororesin (A) or a method of directly using a solution obtained by polymerization reaction of the fluororesin (A) because excellent productivity is achieved.

In the method of dissolving the fluororesin (A) in a solvent, a method of dissolving the solid matter of the fluororesin (A) in a composition of the good solvent (b-1) and the poor solvent (b-2), and a method of dissolving the solid matter of the fluororesin (A) in the good solvent (b-1) are preferable, and a method of dissolving the fluororesin (A) in a composition of the good solvent (b-1) and the poor solvent (b-2) is particularly preferable. At this time, the obtained solution may be used as it is, or the composition of the good solvent (b-1) and the poor solvent (b-2) or the poor solvent (b-2) may be added to adjust the concentration.

In the method using a solution obtained by polymerizing the fluororesin (A), a method of using a solution obtained by a polymerization reaction of the fluororesin (A) with a composition of the good solvent (b-1) and the poor solvent (b-2) as a polymerization solvent, and a method of directly using a solution obtained by a polymerization reaction of the fluororesin (A) with the good solvent (b-1) as a polymerization solvent are preferable. At this time, the obtained solution may be used as it is, or the composition of the good solvent (b-1) and the poor solvent (b-2) or the poor solvent (b-2) may be added to adjust the concentration of the fluororesin (A).

The particle diameter of the fluororesin particles including the fluororesin-containing aliphatic ring structure according to the second aspect of the present invention is not particularly limited, but the volume average particle diameter is preferably 1 μm to 10,000 μm, more preferably 1 to 1000 μm, and even more preferably 10 μm to 1000 μm because of excellent handleability during molding.

EXAMPLES

Hereinafter, the first aspect and the second aspect of the present invention will be described in more detail based on Examples. However, the Examples merely illustrate the present invention, and the present invention is not intended to be limited to the Examples.

Example of First Aspect of the Present Invention

Method for Measuring Physical Properties (1) Weight Average Molecular Weight Mw

Measurements were performed using a gel permission chromatograph equipped with an RI detector and a column TSKgel SuperHZM-M manufactured by Tosoh Corporation. An eluent was prepared by adding 1,1,1,3,3,3-hexafluoro-2-propanol (manufactured by Wako Pure Chemical Industries, Ltd.) to ASAHIKLIN AK-225 (manufactured by Asahi Glass Co., Ltd.) in an amount of 10% by weight based on AK-225. Standard polymethyl methacrylate manufactured by Agilent Technologies, Inc. was used as a standard sample, and the weight average molecular weight Mw in terms of polymethyl methacrylate was calculated from the elution times of the sample and the standard sample.

(2) Measurement of Volume Average Particle Diameter

The volume average particle diameter (unit: μm) was measured using Microtrac MT3000 manufactured by Microtrac Bell Co., Ltd. and methanol as a dispersion medium.

(3) Calculation of Pv Value

The Pv value, which is the value of the stirrer motor power per unit stirring capacity, was calculated from the following formula. When a 4-blade slant paddle stirring blade (blade diameter 50 mm, inclination)45° was used, Np of 4.2 was used.

[Math. 3]

$$Pv \text{ value} = Np \times \rho \times \left(\frac{n}{60}\right)^3 \times \left(\frac{d}{1000}\right)^5 / V \quad (10)$$

(Here, Np: power factor, ρ: solution density (kg/m³), n: rotation speed of stirring blade (rpm), d: diameter of stirring blade (mm), V: solution amount (L).)

(4) Measurement of Haze

A mold in which the center of a 1 mm thick plate was hollowed out was placed on the smooth metal plate on which a polyimide film was placed, the fluororesin was placed on the hollowed-out portion, a polyimide film and a metal plate were placed thereon to sandwich the fluororesin, the sandwiched structure was placed on a press machine, heated at 280° C. for 10 min without applying pressure, then heated and pressed at a pressure of 10 MPa and 280° C. for 10 min with a press machine, then pressure release and heat-pressing under 10 MPa were repeated for 5 min, then heat pressing was performed at a pressure of 10 MPa and 280° C. for 10 min with a press machine, the pressure was thereafter released, and the molded product sandwiched between the metal plates was further sandwiched between metal plates for cooling and cooled to obtain a heat-press molded product (thickness 1 mm). The haze of the obtained heat-press molded product (thickness 1 mm) was measured according to JIS K 7136 by using a haze meter NDH5000 (light source: white LED) manufactured by Nippon Denshoku Kogyo Co., Ltd. to determine the haze (%).

(5) Measurement of Insoluble Matter 1,1,1,2,3,4,4,5,5,5-Decafluoro-3-methoxy-2-(trifluoromethyl)pentane ($C_2F_5CF(OCH_3)C_3F_7$, manufactured by 3M Japan Ltd., Novec 7300) is added to the fluororesin to adjust the solid fraction concentration to 10% by weight. A fluororesin solution is prepared by dissolving at 50° C. for 5 h and stirring with shaking. The solution was pressure-filtered by a pressure filter equipped with a PTFE membrane filter that had a pore size of 0.1 μm and a prerecorded weight, the remaining fluororesin was washed by repeatedly performing pressure filtration by using Novec 7300 from which foreign matter was removed in advance by a filter having a pore size of 0.1 μm and introducing Novec 7300 from which foreign matter was removed into the pressure filter, the filter was then taken out and vacuum dried, the weight of the filter weight before filtration was subtracted from the obtained filter weight to determine the amount of residue on the filter, and the amount of residue on the filter was divided by the weight of the resin used, and the amount of insoluble matter (% by weight) was determined by determining the ratio.

(6) Measurement of Bulk Density

The fluororesin A is weighed and placed, without applying vibration, in a glass sample tube which has a volume of 13.5 mL (the liquid level height when 10 mL of water is added is 2.8 cm) and for which the height per unit volume was measured in advance. From the height of the powder and the weight of the powder at that time, the bulk density can be calculated according to the following formula. The bulk density at this time is called loose bulk density.

Bulk density=(powder weight (g))/(powder height (cm)/0.28 (cm/mL))

(7) Measurement of Yellow Index (YI)

A total of 2.0 g of fluororesin was weighed into a Petri dish with an inner diameter of 26.4 mm (only a receiver in a set including a lid and a receiver in a flat Petri dish manufactured by Flat Co., Ltd., a glass thickness of 1 mm at the bottom), the Petri dish was placed in an inert oven (DN4111, manufactured by Yamato Scientific Co., Ltd.) and allowed to stand at room temperature for 30 min under an air stream (20 L/min), and the temperature was then raised to 280° C. over 30 min, followed by heating at 280° C. for 24 h. After that, the power of the inert oven was turned off while the oven door was closed and the air flow was maintained (20 L/min), and the sample was naturally cooled for 12 h and taken out. As a result, a fluororesin heat-melted molded product having a thickness of 3 mm and a diameter of 26.4 mm was obtained on the Petri dish. At this time, air compressed by a compressor and passed through a dehumidifier (dew point temperature −20° C. or lower) was used as the air. The transmittance was measured at each wavelength at 1 nm intervals at wavelengths of 200 nm to 1500 nm using a spectrophotometer (U-4100, manufactured by Hitachi High-Tech Science Co., Ltd.) for each obtained fluororesin heat-melted molded product together with the Petri dish. Data at 5 nm intervals at wavelengths of 380 nm to 780 nm were extracted from the measured transmittance data, and the tristimulus values X, Y, and Z of the XYZ color system were calculated according to the method of JIS Z 8701, the yellow index (YI) under a C light source (auxiliary illuminant C) was calculated according to the method of JIS K 7373, and the yellow index (YI) of the fluororesin heat-melted molded product including the Petri dish was obtained. The yellow index (YI) of the Petri dish (receiver only) alone was measured, and the yellow index (YI) of the Petri dish (receiver only) was subtracted from the yellow index (YI) of the fluororesin molded product including the Petri dish to obtain the yellow index (YI) of the fluororesin heat-melted molded product having a thickness of 3 mm. The yellow index (YI) of the Petri dish alone (receiver only) was 0.21.

Example 1-1

A total of 0.173 g (0.000410 mol) of bis(2,3,4,5,6-pentafluorobenzoyl) peroxide as an initiator, 20.0 g (0.0820 mol) of perfluoro(4-methyl-2-methylene-1,3-dioxolane) as a monomer, 80.00 g of Novec 7300 (manufactured by 3M Japan Ltd., $C_2F_5CF(OCH_3)C_3F_7$) as a polymerization solvent, and 2.22 g (0.0186 mol) of chloroform (manufactured by Wako Pure Chemical Industries, Ltd.) as a chain transfer agent were placed in a glass ampoule having a capacity of 75 mL and were sealed under reduced pressure after repeating nitrogen substitution by freeze degassing and depressurization (monomer/solvent=20/80 (wt/wt)). When this ampoule was placed in a thermostat at 55° C. and held for 24 h to carry out radical solution polymerization, a viscous liquid in which the resin was dissolved was obtained. After cooling to room temperature, the ampoule was opened, and the resin solution was diluted with 100 g of Novec 7300 for viscosity adjustment to prepare a resin diluted solution (solid fraction concentration: 10% by weight). The resin diluted solution was placed in a pressure filtration device (manufactured by ADVANTEC) equipped with a PTFE membrane filter (manufactured by ADVANTEC, TO10A) having a pore size of 0.1 μm, and pressure filtration was performed to remove components insoluble in the solvent.

The solution was transferred to a separable flask with a capacity of 1000 mL that was equipped with a 4-blade slant paddle stirring blade (blade diameter 50 mm, blade width 12 mm, inclination)45°), a three-one motor, and a water bath and was heated to 50° C., and the solution was heated to 50° C. and held for 5 min while stirring at 200 rpm. Then, 270 g of ZEORORA-H (manufactured by Nippon Zeon Co., Ltd, 1,2,2,3,3,4,4-heptafluorocyclopentane) was added, followed by holding for 5 min at 50° C. while stirring at 200 rpm (ZEORORA-H/Novec 7300=60/40 (wt/wt)). The water bath was removed while stirring at 600 rpm (Pv value: 8.1 kw/m$^3$), and the solution was allowed to cool in air and was cooled to 30° C. in about 30 min to obtain a particulate solid matter. Then, 150 g of ZEOROLLA-H was further added while stirring at 600 rpm (ZEOROLLA-H/Novec 7300=70/30 (wt/wt)). Particles of the fluororesin A were obtained by suction filtration, washing with acetone twice, and vacuum drying under heating. The obtained resin had a weight average molecular weight of 7.2×10$^4$, had fine particles having a volume average particle diameter of 88 μm, and had almost no coarse particles. At this time, acetone filtered in advance through a 0.1 μm PTFE filter was used. Table 1 shows the evaluation results of the fluororesin. Meanwhile, the operation of washing by passing 50 g of Novec 7300 through the PTFE filter used for filtering the resin diluted solution was repeated 5 times, followed by drying. When the insoluble matter on the obtained filter was confirmed by microscopic-IR, it was confirmed that the insoluble matter contained a fluororesin component including a perfluoro(4-methyl-2-methylene-1,3-dioxolane) residue unit. By removing this resin component (unnecessary substance), the haze of the fluororesin was clearly reduced as compared with Comparative Example 1-1.

Example 1-2

A solution in which 0.0865 g (0.000205 mol) of bis (2,3,4,5,6-pentafluorobenzoyl) peroxide as an initiator was dissolved in 0.260 g of hexafluorobenzene was placed in a glass ampoule equipped with a magnetic stirrer, 10.0 g (0.0205 mol) of perfluoro (4-methyl-2-methylene-1,3-dioxolane) as a monomer, 39.74 g of ZEORORA-H (manufactured by Nippon Zeon Co., Ltd., 1,2,2,3,3,4,4-heptafluorocyclopentane) as a polymerization solvent, and 1.111 g (0.00931 mol) of chloroform (manufactured by Wako Pure Chemical Industries, Ltd.) as a chain transfer agent were added, and the ampule was sealed under reduced pressure after repeating nitrogen substitution by freeze degassing and depressurization (amount of chain transfer agent: 10% by weight based on the total of monomer and chain transfer agent). Precipitation polymerization was carried out by holding at 55° C. for 24 h while stirring with the magnetic stirrer in an upright state of the ampule. As a result, a cloudy slurry was obtained in which the resin was precipitated in the polymerization solvent. After cooling to room temperature, the ampoule was opened, and the liquid including the produced resin particles was filtered off, washed with acetone, and vacuum dried to obtain particulate perfluoro (4-methyl-2-methylene-1,3-dioxolane) resin having a volume average particle diameter of 95 μm. A total of 90 g of Novec 7300 (manufactured by 3M Japan Ltd., $C_2F_5CF(OCH_3)C_3F_7$) was added to 10.0 g of the obtained fluororesin, and the resin was dissolved by heating at 50° C. for 4 h to prepare a resin diluted solution (solid fraction concentration 10% by weight). The resin diluted solution was placed in a pressure filtration device (manufactured by ADVANTEC) equipped with a PTFE membrane filter (manufactured by ADVANTEC, T010A) having a pore size of 0.1 μm, and pressure filtration was performed to remove components insoluble in the solvent. A total of 2 L of acetone was placed in a plastic cup equipped with an anchor blade, the resin was precipitated by adding, while stirring, the pressure-filtered resin diluted solution to a beaker, and the precipitated resin was recovered by filtration, washed once with acetone and vacuum dried to obtain a powdery perfluoro(4-methyl-2-methylene-1,3-dioxolane) resin. The obtained fluororesin had a weight average molecular weight of 9.7×10$^4$. Table 1 shows the evaluation results of the fluororesin. At this time, acetone filtered in advance through a 0.1 μm PTFE filter was used. Meanwhile, the operation of washing by passing 50 g of Novec 7300 through the PTFE filter used for filtering the resin diluted solution was repeated 5 times, followed by drying. When the insoluble matter on the obtained filter was confirmed by microscopic-IR, it was confirmed that the insoluble matter contained a fluororesin component including a perfluoro(4-methyl-2-methylene-1, 3-dioxolane) residue unit. By removing this resin component (unnecessary substance), the haze of the fluororesin was clearly reduced as compared with Comparative Example 1-1.

Example 1-3

A total of 0.173 g (0.000410 mol) of bis (2,3,4,5,6-pentafluorobenzoyl) peroxide as an initiator, 20.0 g (0.0820 mol) of perfluoro(4-methyl-2-methylene-1,3-dioxolane) as a monomer, 80.00 g of Novec 7300 (manufactured by 3M Japan Ltd., $C_2F_5CF(OCH_3)C_3F_7$) as a polymerization solvent, and 2.22 g (0.0186 mol) of chloroform (manufactured by Wako Pure Chemical Industries, Ltd.) as a chain transfer agent were placed in a glass ampoule having a capacity of 75 mL and were sealed under reduced pressure after repeating nitrogen substitution by freeze degassing and depressurization (monomer/solvent =20/80 (wt/wt)). When this ampoule was placed in a thermostat at 55° C. and held for 24 h to carry out radical solution polymerization, a viscous liquid in which the resin was dissolved was obtained. After cooling to room temperature, the ampoule was opened, and the resin solution was diluted with 100 g of Novec 7300 for viscosity adjustment to prepare a resin diluted solution (solid fraction concentration: 10% by weight). The resin diluted solution was placed in a pressure filtration device (manufactured by ADVANTEC) equipped with a PTFE membrane filter (manufactured by ADVANTEC, T010A) having a pore size of 0.1 μm, and pressure filtration was performed to remove components insoluble in the solvent.

The solution was transferred to a separable flask with a capacity of 1000 mL that was equipped with a 4-blade slant paddle stirring blade (blade diameter 50 mm, blade width 12 mm, inclination)45° , a three-one motor, and a water bath and heated to 50° C., and 420 g of ZEORORA-H (manufactured by Nippon Zeon Co., Ltd, 1,2,2,3,3,4,4-heptafluorocyclopentane) was slowly added while stirring at 600 rpm (Pv value: 20.6 kw/m$^3$) to obtain a particulate solid matter (ZEORORA-H/Novec 7300 =70/30 (wt/wt); Pv value after completion of addition: 6.1 kw/m$^3$). Particles of the fluororesin A were obtained by suction filtration, washing with acetone twice, and vacuum drying under heating. The obtained resin had a weight average molecular weight of 7.9×10$^4$, had fine particles having a volume average particle diameter of 87 μm, and had almost no coarse particles. At this time, ZEORORA-H, Novec 7300, and acetone that were used after the precipitation step were filtered in advance through a 0.1 μm PTFE filter. Table 1 shows the evaluation results of the fluororesin. Meanwhile, the operation of washing by passing 50 g of Novec 7300 through the PTFE filter used for filtering the resin diluted solution was repeated 5 times, followed by drying. When the insoluble matter on the obtained filter was confirmed by microscopic-IR, it was confirmed that the insoluble matter contained a fluororesin component including a perfluoro(4-methyl-2-methylene-1, 3-dioxolane) residue unit. By removing this resin component (unnecessary substance), the haze of the fluororesin was clearly reduced as compared with Comparative Example 1-1.

Example 1-4

A total of 0.173 g (0.000410 mol) of bis (2,3,4,5,6-pentafluorobenzoyl) peroxide as an initiator, 20.0 g (0.0820 mol) of perfluoro(4-methyl-2-methylene-1,3-dioxolane) as a monomer, 80.00 g of Novec 7300 (manufactured by 3M Japan Ltd., $C_2F_5CF(OCH_3)C_3F_7$) as a polymerization solvent, and 2.22 g (0.0186 mol) of chloroform (manufactured by Wako Pure Chemical Industries, Ltd.) as a chain transfer agent were placed in a glass ampoule having a capacity of 75 mL and were sealed under reduced pressure after repeating nitrogen substitution by freeze degassing and depressurization (monomer/solvent=20/80 (wt/wt)). When this ampoule was placed in a thermostat at 55° C. and held for 24 h to carry out radical solution polymerization, a viscous liquid in which the resin was dissolved was obtained. After cooling to room temperature, the ampoule was opened, and the resin solution was diluted with 100 g of Novec 7300 for viscosity adjustment to prepare a resin diluted solution (solid fraction concentration: 10% by weight). The resin diluted solution was placed in a pressure filtration device (manufactured by ADVANTEC) equipped with a PTFE membrane filter (manufactured by ADVANTEC, TO10A) having a pore size of 0.1 μm, and pressure filtration was performed to remove components insoluble in the solvent. A total of 2 L of acetone was placed in a plastic cup equipped with an anchor blade, the resin was precipitated by adding, while stirring, the pressure-filtered resin diluted solution to a beaker, and the precipitated resin was recovered by filtration, washed twice with acetone and vacuum dried to obtain a powdery perfluoro(4-methyl-2-methylene-1,3-dioxolane) resin. The obtained fluororesin had a weight average molecular weight of $5.7 \times 10^4$. At this time, acetone filtered in advance through a 0.1 μm PTFE filter was used. Table 1 shows the evaluation results of the fluororesin. Meanwhile, the operation of washing by passing 50 g of Novec 7300 through the PTFE filter used for filtering the resin diluted solution was repeated 5 times, followed by drying. When the insoluble matter on the obtained filter was confirmed by microscopic-IR, it was confirmed that the insoluble matter contained a fluororesin component including a perfluoro(4-methyl-2-methylene-1,3-dioxolane) residue unit. By removing this resin component (unnecessary substance), the haze of the fluororesin was clearly reduced as compared with Comparative Example 1-1.

Example 1-5

A total of 0.173 g (0.000410 mol) of bis (2,3,4,5,6-pentafluorobenzoyl) peroxide as an initiator, 20.0 g (0.0820 mol) of perfluoro(4-methyl-2-methylene-1,3-dioxolane) as a monomer, 80.00 g of Novec 7300 (manufactured by 3M Japan Ltd., $C_2F_5CF(OCH_3)C_3F_7$) as a polymerization solvent, and 2.22 g (0.0186 mol) of chloroform (manufactured by Wako Pure Chemical Industries, Ltd.) as a chain transfer agent were placed in a glass ampoule having a capacity of 75 mL and were sealed under reduced pressure after repeating nitrogen substitution by freeze degassing and depressurization (monomer/solvent=20/80 (wt/wt)). When this ampoule was placed in a thermostat at 55° C. and held for 24 h to carry out radical solution polymerization, a viscous liquid in which the resin was dissolved was obtained. After cooling to room temperature, the ampoule was opened (solid fraction concentration: 20% by weight). The resin solution was placed in a pressure filtration device (manufactured by ADVANTEC) equipped with a PTFE membrane filter (manufactured by ADVANTEC, $T_{500}A$) having a pore size of 5 μm, and pressure filtration was performed to remove components insoluble in the solvent. For viscosity adjustment, the resin solution was diluted with 100 g of Novec 7300 filtered in advance through a 0.1 μm PTFE filter to prepare a resin diluted solution (solid fraction concentration: 10% by weight). A total of 2 L of acetone was placed in a plastic cup equipped with an anchor blade, the resin was precipitated by adding, while stirring, the pressure-filtered resin diluted solution to a beaker, and the precipitated resin was recovered by filtration, washed twice with acetone and vacuum dried to obtain a powdery perfluoro(4-methyl-2-methylene-1,3-dioxolane) resin. The obtained fluororesin had a weight average molecular weight of $5.5 \times 10^4$. At this time, acetone filtered in advance through a 0.1 μm PTFE filter was used. Table 1 shows the evaluation results of the fluororesin. Meanwhile, the operation of washing by passing 50 g of Novec 7300 through the PTFE filter used for filtering the resin diluted solution was repeated 5 times, followed by drying. When the insoluble matter on the obtained filter was confirmed by microscopic-IR, it was confirmed that the insoluble matter contained a fluororesin component including a perfluoro(4-methyl-2-methylene-1,3-dioxolane) residue unit. By removing this resin component (unnecessary substance), the haze of the fluororesin was clearly reduced as compared with Comparative Example 1-1.

Example 1-6

A total of 0.173 g (0.000410 mol) of bis (2,3,4,5,6-pentafluorobenzoyl) peroxide as an initiator, 20.0 g (0.0820 mol) of perfluoro(4-methyl-2-methylene-1,3-dioxolane) as a monomer, 80.00 g of FC-72 (manufactured by 3M Japan Ltd., perfluorohexane) as a polymerization solvent, and 2.22 g (0.0186 mol) of chloroform (manufactured by Wako Pure Chemical Industries, Ltd.) as a chain transfer agent were placed in a glass ampoule having a capacity of 75 mL and were sealed under reduced pressure after repeating nitrogen substitution by freeze degassing and depressurization (monomer/solvent=20/80 (wt/wt)). When this ampoule was placed in a thermostat at 55° C. and held for 24 h to carry out radical solution polymerization, a viscous liquid in which the resin was dissolved was obtained. After cooling to room temperature, the ampoule was opened (solid fraction concentration: 20% by weight). After cooling to room temperature, the ampoule was opened, and the resin solution was diluted with 100 g of FC-72 for viscosity adjustment to prepare a resin diluted solution (solid fraction concentration: 10% by weight). The resin diluted solution was placed in a pressure filtration device (manufactured by ADVANTEC) equipped with a PTFE membrane filter (manufactured by ADVANTEC, T010A) having a pore size of 0.1 μm, and pressure filtration was performed to remove components insoluble in the solvent. A total of 2 L of hexane was placed in a plastic cup equipped with an anchor blade, the resin was precipitated by adding, while stirring, the pressure-filtered resin diluted solution to a beaker, and the precipitated resin was recovered by filtration, washed twice with acetone and vacuum dried to obtain a powdery perfluoro(4-methyl-2-methylene-1,3-dioxolane) resin. The obtained fluororesin had a weight average molecular weight of $7.2 \times 10^4$. At this time, hexane and acetone filtered in advance through a 0.1 μm PTFE filter were used. Table 1 shows the evaluation results of the fluororesin. Meanwhile, the operation of washing by passing 50 g of Novec 7300 through the PTFE filter used for filtering the resin diluted solution was repeated 5 times, followed by drying. When the insoluble matter on the obtained filter was confirmed by microscopic-IR, it was confirmed that the insoluble matter contained a fluororesin component including a perfluoro(4-methyl-2-methylene-1,3-dioxolane) residue unit. By removing this resin component (unnecessary substance), the haze of the fluororesin was clearly reduced as compared with Comparative Example 1-1.

Example 1-7

A total of 0.173 g (0.000410 mol) of bis (2,3,4,5,6-pentafluorobenzoyl) peroxide as an Initiator, 20.0 g (0.0820 mol) of perfluoro(4-methyl-2-methylene-1,3-dioxolane) as a monomer, 80.00 g of hexafluorobenzene (manufactured by Tokyo Chemical Industry Co., Ltd.) as a polymerization solvent, and 2.22 g (0.0186 mol) of chloroform (manufactured by Wako Pure Chemical Industries, Ltd.) as a chain transfer agent were placed in a glass ampoule having a capacity of 75 mL and were sealed under reduced pressure after repeating nitrogen substitution by freeze degassing and depressurization (monomer/solvent=20/80 (wt/wt)). When this ampoule was placed in a thermostat at 55° C. and held for 24 h to carry out radical solution polymerization, a viscous liquid in which the resin was dissolved was obtained. After cooling to room temperature, the ampoule was opened (solid fraction concentration: 20% by weight). After cooling to room temperature, the ampoule was opened, and the resin solution was diluted with 100 g of hexafluorobenzene for viscosity adjustment to prepare a resin diluted solution (solid fraction concentration: 10% by weight). The resin diluted solution was placed in a pressure filtration device (manufactured by ADVANTEC) equipped with a PTFE membrane filter (manufactured by ADVANTEC, T010A) having a pore size of 0.1 μm, and pressure filtration was performed to remove components insoluble in the solvent. A total of 2 L of chloroform was placed in a plastic cup equipped with an anchor blade, the resin was precipitated by adding, while stirring, the pressure-filtered resin diluted solution to a beaker, and the precipitated resin was recovered by filtration and vacuum dried to obtain a powdery perfluoro(4-methyl-2-methylene-1,3-dioxolane) resin. The obtained fluororesin had a weight average molecular weight of $6.5 \times 10^4$. Table 1 shows the evaluation results of the fluororesin. Meanwhile, the operation of washing by passing 50 g of Novec 7300 through the PTFE filter used for filtering the resin diluted solution was repeated 5 times, followed by drying. When the insoluble matter on the obtained filter was confirmed by microscopic-IR, it was confirmed that the insoluble matter contained a fluororesin component including a perfluoro(4-methyl-2-methylene-1,3-dioxolane) residue unit. By removing this resin component (unnecessary substance), the haze of the fluororesin was clearly reduced as compared with Comparative Example 1-1.

Comparative Example 1-1

The operations were performed according to the description of Sample 93 of Table 2 of NPL 1. However, since the polymer concentration at the time of reprecipitation purification was not described, dilution was performed to 10% by weight. A total of 0.0880 g (0.000209 mol) of bis(2,3,4,5,6-pentafluorobenzoyl) peroxide as an initiator, 20.0 g (0.0820 mol) of and perfluoro(4-methyl-2-methylene-1,3-dioxolane) as a monomer and 32.63 g of hexafluorobenzene as a polymerization solvent were placed in a glass ampoule having a capacity of 75 mL and were sealed under reduced pressure after repeating nitrogen substitution by freeze degassing and depressurization (monomer/solvent=38/62 (wt/wt)). When this ampoule was placed in a thermostat at 60° C. and held for 24 h to carry out radical solution polymerization, a viscous liquid in which the resin was dissolved was obtained. After cooling to room temperature, the ampoule was opened, and the resin solution was diluted with 147 g of hexafluorobenzene for viscosity adjustment to prepare a resin diluted solution. A total of 1 L of chloroform was placed in a beaker equipped with an anchor blade, the resin was precipitated by adding, while stirring, the resin diluted solution to the beaker, and the precipitated resin was recovered by filtration, and vacuum dried to obtain a perfluoro(4-methyl-2-methylene-1,3-dioxolane) resin of an indeterminate shape. The molded product of the obtained fluororesin after heating at 280° C. for 24 h had a large number of bubbles, but the coloring was stronger than that of Example 1-1 and the same as or somewhat stronger than that of Example 1-7 in visual observation. Further, when the average size of the obtained fluororesin was measured with a ruler, the average size was about 10 mm. The weight average molecular weight of the obtained fluororesin was $3.7 \times 10^5$. Table 1 shows the evaluation results of the fluororesin.

TABLE 1

| | Example 1-1 | Example 1-2 | Example 1-3 | Example 1-4 |
|---|---|---|---|---|
| Amount of insoluble (% by weight) | 0.05 or less | 0.05 or less | 0.05 or less | 0.05 or less |
| Haze of hot-press molded product (thickness 1 mm) (%) | 0.3 | 0.5 | 0.4 | 0.5 |
| Bulk density of fluororesin (g/cm$^3$) | 0.48 | 0.20 | 0.44 | 0.23 |
| Yellow index (YI) after heating at 280° C. for 24 h | 1.9 | 0.8 | 1.8 | 1.0 |

TABLE 1-continued

|  | Example 1-5 | Example 1-6 | Example 1-7 | Comparative Example 1-1 |
|---|---|---|---|---|
| Amount of insoluble (% by weight) | 0.1 or less | 0.05 or less | 0.05 or less | 0.3 |
| Haze of hot-press molded product (thickness 1 mm) (%) | 1.0 | 0.7 | 1.1 | 3.1 |
| Bulk density of fluororesin (g/cm$^3$) | 0.22 | 0.17 | 0.11 | 0.074 |
| Yellow index (YI) after heating at 280° C. for 24 h | 1.1 | 0.9 | 4.7 | Large number of bubbles |

Reference Example 1-1

The fluororesin A (weight average molecular weight Mw=7.2×10$^4$) prepared in Example 1-1 was immersed at 50° C. for 5 h or more in various organic solvents each taken in an amount (w/w) 20 times that of the fluororesin A, and it was visually confirmed whether the resin was dissolved. The results are described hereinbelow.

Solvents that dissolved the resin: FC-72, FC-770, Novec 7200, Novec 7300, and hexafluorobenzene. When the solutions obtained by dissolution in these solvents were cooled to 25° C., all of them maintained the dissolved state. In each case, there was almost no undissolved residue, and the solubility was 90% by weight or more.

Solvents that did not dissolve the resin: ZEORORA-H, AE-3000, trifluoroethanol, ethyl acetate, chloroform, acetone, and hexane. In each case, the recovery rate of the fluororesin A after cooling to 25° C., filtration and drying was more than 80%, and the solubility was less than 20% by weight.

Reference Example 1-2

A fluororesin A solution obtained by dissolving the fluororesin A (weight average molecular weight Mw=7.2×10$^4$) in Novec 7300 at a solid fraction concentration of 10% by weight was dropwise added at 25° C. to the following organic solvents each taken in an amount 10 times that of the fluororesin A, and it was visually confirmed whether the solid matter was precipitated. The following results were obtained.

Solvents in which solid matter did not precipitate: FC-72, FC-770, Novec 7200, Novec 7300, and hexafluorobenzene. In each case, there was no precipitate and the solubility was 90% by weight or more.

Solvents in which solid matter precipitated: ZEORORA-H, AE-3000, trifluoroethanol, ethyl acetate, chloroform, acetone, and hexane. In each case, the recovery rate of the fluororesin A after filtration and drying was more than 80%, and the solubility was less than 20% by weight.

Example of Second Aspect of Present Invention

Measurement of Weight Average Molecular Weight Mw

Measurements were performed using gel permission chromatography equipped with a column TSKgel Super-AWM-H and an RI detector manufactured by Tosoh Corporation. Standard polymethyl methacrylate manufactured by Agilent Technologies, Inc. was used as a standard sample, and the weight average molecular weight Mw in terms of polymethyl methacrylate was calculated from the elution times of the sample and the standard sample.

Measurement of Volume Average Particle Diameter

The volume average particle diameter (unit: pm) was measured using MT3000 manufactured by Microtrack Bell Co., Ltd. and methanol as a dispersion medium.

Calculation of Pv Value

The Pv value, which is the value of the stirrer motor power per unit stirring capacity, was calculated from the following formula. When a 4-blade slant paddle stirring blade (blade diameter 40 mm, blade width 8 mm, inclination 45°) was used, Np of 1.25 was used.

[Math. 4]

$$Pv \text{ value} = Np \times \rho \times \left(\frac{n}{60}\right)^3 \times \left(\frac{d}{1000}\right)^5 / V \quad (5)$$

(Here, Np: power factor, ρ: solution density (kg/m$^3$), n: rotation speed of stirring blade (rpm), d: diameter of stirring blade (mm), V: solution amount (L).)

Synthesis Example 2-1

A total of 0.017 g of bis (2,3,4,5,6-pentafluorobenzoyl) peroxide as a radical polymerization initiator, 5 g of perfluoro(4-methyl-2-methylene-1,3-dioxolane) as a monomer, and 20 g of FC-72 (manufactured by 3M Japan Ltd.) as a polymerization solvent were placed in a glass ampoule having a capacity of 75 mL and were sealed under reduced pressure after repeating nitrogen substitution by freeze degassing and depressurization. The ampoule was placed in a thermostat at 55° C. and held for 24 h to carry out radical solution polymerization. After cooling to room temperature, the ampoule was opened, and the resin solution was diluted with 25 g of FC-72 for viscosity adjustment to prepare a resin diluted solution. Hexane was added to a beaker equipped with a stirrer, the resin diluted solution was added to the hexane to precipitate a resin under stirring, suction filtration was performed, and then vacuum drying was performed under heating to obtain a fluororesin (A) including a fluorine-containing aliphatic ring structure (poly(perfluoro(4-methyl-2-methylene-1,3-dioxolane)). The obtained fluororesin (A) was composed of fibers having a length of 5 cm or more. The fluororesin was fluffy, and there was significant amount of wrapping around the stirrer when the resin diluted solution was added to hexane. The weight average molecular weight Mw was 470,000.

Reference Example 2-1

The fluororesin A was immersed for 5 h or more in various organic solvents at 50° C., and it was visually confirmed whether the resin was dissolved. The results are described hereinbelow.

Solvents that dissolved the resin: FC-72, FC-770, Novec 7200, Novec 7300, and hexafluorobenzene.

When the solutions obtained by dissolution in these solvents were cooled to 25° C., all of them maintained the dissolved state. In each case, there was almost no undissolved residue, and the solubility was 90% by weight or more.

Solvents that did not dissolve the resin: ZEORORA-H, AE-3000, trifluoroethanol, ethyl acetate, chloroform, acetone, and hexane.

Reference Example 2-2

When a solution obtained by dissolving the fluororesin (A) in FC-72 was dropwise added to the following organic solvents at 25° C., no solid matter was precipitated.

FC-72, FC-770, Novec 7200, Novec 7300, and hexafluorobenzene

Comparative Example 2-1

When a solution obtained by dissolving the fluororesin (A) in FC-72 was dropwise added to the following organic solvents at 25° C., a solid matter was precipitated. The obtained fluororesin (A) had a fluffy shape in which fibers having a length of 5 cm or more were combined together.

ZEORORA-H, AE-3000, trifluoroethanol, ethyl acetate, chloroform, acetone, and hexane: in each case, the recovery rate of the fluororesin (A) after filtration and drying was more than 80%, and the solubility was 20% by weight or less.

Example 2-1

A total of 5.0 g of the fluororesin (A), 21.31 g of Novec 7200 (manufactured by 3M Japan Ltd. Ltd.) as a good solvent (b-1), and 14.21 g of ZEORORA-H (manufactured by Zeon Co., Ltd.) as a poor solvent (b-2) were taken in a 50 mL sample tube equipped with a stirrer and were sealed and stirred at 50° C. to dissolve the fluororesin (A) and prepare a solution. The solution returned to room temperature was poured into a separable flask with a capacity of 50 mL equipped with a 4-blade slant paddle stirring blade (blade diameter 40 mm, blade width 8 mm, inclination 45°) a three-one motor, and a water bath, and when 7.10 g of ZEORORA-H was thereafter added while stirring at 150 rpm, a lumpy solid matter was precipitated. A fluororesin (A) solution was obtained by heating to 50° C. while stirring at 150 rpm and holding for 10 min (ZEORORA-H/Novec 7200=50/50 (wt/wt)) (the above-described step is referred to as a "solution preparation step").

The water bath was removed while stirring at 500 rpm (Pv value: 4.4 kW/m$^3$), and the fluororesin (A) solution was allowed to cool in air and was cooled to 30° C. in about 10 min to 20 min to obtain a particulate solid matter (this step is referred to as a "precipitation step"). At this time, precipitation of the particulate solid matter began at about 40° C.

Then, while stirring at 500 rpm, 18.27 g of ZEORORA-H was further added (ZEORORA-H/Novec 7200=65/35 (wt/wt)) (this step is referred to as a "poor solvent addition step").

The obtained solution was suction-filtered and vacuum-dried under heating to obtain particles of a fluororesin A including a fluorine-containing aliphatic ring structure (poly (perfluoro(4-methyl-2-methylene-1,3-dioxolane)) (this step is referred to as the "separation step").

The obtained particles were fine particles having a volume average particle diameter of 130 μm and included almost no coarse particles.

Example 2-2

Particles of a fluororesin A were obtained by performing the same operations as in Example 2-1 except that in the precipitation step, the fluororesin A solution was stirred at 250 rpm (Pv value: 0.54 kW/m$^3$). The obtained particles were fine particles having a volume average particle diameter of 270 μm and included almost no coarse particles.

Example 2-3

The same operations as in Example 2-1 were performed except that in Example 2-1, 5.0 g of fluororesin (A), 21.32 g of Novec 7200 (manufactured by 3M Japan Ltd.) as a good solvent (b-1), and 14.21 g of ZEORORA-H (manufactured by Nippon Zeon Co., Ltd.) as a poor solvent (b-2) were taken in a 50 mL sample tube equipped with a stirrer and were sealed and stirred at 50° C. to dissolve the fluororesin (A) and prepare a solution, the solution was pressure filtered using a 1 μm PTFE membrane filter, and a filtration step was performed to remove foreign matter. The obtained particles were fine particles having a volume average particle diameter of 150 μm and included almost no coarse particles.

Example 2-4

The same operations as in Example 2-1 were performed except that AE-3000 (manufactured by Asahi Glass Co., Ltd.) was used instead of ZEORORA-H as the poor solvent (b-2). The obtained particles were fine particles having a volume average particle diameter of 170 μm and included almost no coarse particles.

Example 2-5

The same operations as in Example 2-1 were performed except that Novec 7300 (manufactured by 3M Japan Ltd. Ltd.) was used instead of Novec 7200 as a good solvent (b-1). The obtained particles were fine particles having a volume average particle diameter of 40 μm and included almost no coarse particles.

Example 2-6

A total of 5.0 g of the fluororesin (A) and 21.31 g of hexafluorobenzene (manufactured by Tokyo Chemical Industry Co., Ltd.) as a good solvent (b-1) were taken in a 50 mL sample tube equipped with a stirrer and were sealed and stirred at 50° C. to dissolve the fluororesin (A) and prepare a solution. The solution returned to room temperature was poured into a separable flask with a capacity of 50 mL equipped with a 4-blade slant paddle stirring blade (blade diameter 40 mm, blade width 8 mm, inclination)45° a three-one motor, and a water bath, and when 11.48 g of ZEORORA-H was thereafter added as a poor solvent (b-2) while stirring at 150 rpm, a lumpy solid matter was precipitated. By heating to 50° C. with stirring at 150 rpm and holding for 10 min, most of the fluororesin (A) was dissolved in an organic solvent, and a cloudy solution was obtained (ZEORORA-H/hexafluorobenzene=35/65 (wt/wt)).

The cloudy solution in which most of the fluororesin (A) was dissolved in an organic solvent was stirred at 500 rpm (Pv value: 4.4 kW/m$^3$), the water bath was removed, and the solution was allowed to cool in air and was cooled to 30° C. in about 10 min to 20 min to obtain a particulate solid matter. Then, 9.84 g of ZEORORA-H was further added while stirring at 500 rpm (ZEORORA-H/hexafluorobenzene=50/50 (wt/wt)). Particles of the fluororesin (A) were obtained by suction filtration and vacuum drying under heating. The obtained particles were fine particles having a volume average particle diameter of 410 μm and included almost no coarse particles.

Example 2-7

A total of 5.0 g of the fluororesin (A), 21.31 g of FC-72 (manufactured by 3M Japan Ltd.) as a good solvent (b-1), and 14.21 g of ZEORORA-H (manufactured by 3M Japan Ltd.) as a poor solvent (b-2) were taken in a 50 mL sample tube equipped with a stirrer and were sealed and stirred at 50° C. to dissolve the fluororesin (A) and prepare a solution (ZEORORA-H/FC-72=40/60 (wt/wt)). The solution returned to room temperature was poured into a separable flask with a capacity of 50 mL equipped with a 4-blade slant paddle stirring blade (blade diameter 40 mm, blade width 8 mm, inclination 45°) a three-one motor, and a water bath, and when 21.31 g of ZEORORA-H was thereafter added while stirring at 150 rpm, a lumpy solid matter was precipitated. By heating to 50° C. with stirring at 150 rpm and holding for 10 min, a solution in which the fluororesin (A) was separated into an organic solvent in a gel form was obtained (ZEORORA-H/FC-72=62.5/37.5 (wt/wt)).

The solution in which the fluororesin (A) was separated into an organic solvent in a gel form was stirred at 500 rpm (Pv value: 4.4 kW/m$^3$), the water bath was removed, and the solution was allowed to cool in air and was cooled to 30° C. in about 10 min to 20 min to obtain a particulate solid matter. Then, 14.21 g of ZEORORA-H was further added while stirring at 500 rpm (ZEORORA-H/FC-72=70/30 (wt/wt)). Particles of the fluororesin (A) were obtained by suction filtration and vacuum drying under heating. The obtained particles had an average particle diameter of about 1.5 mm as measured by a ruler, and included coarse particles having a diameter of about 5 mm to 10 mm.

Example 2-8

A total of 5.0 g of the fluororesin (A) and 21.31 g of Novec 7200 (manufactured by 3M Japan Ltd.) as a good solvent (b-1) were taken in a 50 mL sample tube equipped with a stirrer and were sealed and stirred at 50° C. to dissolve the fluororesin (A) and prepare a solution. The solution returned to room temperature was poured into a separable flask with a capacity of 50 mL equipped with a 4-blade slant paddle stirring blade (blade diameter 40 mm, blade width 8 mm, inclination 45°) a three-one motor, and a water bath, and when 2.37 g of ethyl acetate was thereafter added as a poor solvent (b-2) while stirring at 150 rpm, a lumpy solid matter was precipitated. By heating to 50° C. with stirring at 150 rpm and holding for 10 min, a solution in which the fluororesin (A) was dissolved in the organic solvent (B) was obtained (ethyl acetate/Novec 7200=10/90 (wt/wt)). Further, when 1.39 g of ethyl acetate was added and heating to 70° C. was performed, a solution in which the fluororesin A was separated in a gel form was obtained (ethyl acetate/Novec 7200=15/85 (wt/wt)).

The solution in which the fluororesin (A) was separated in a gel form was stirred at 500 rpm (Pv value: 4.4 kW/m$^3$), the water bath was removed, and the solution was allowed to cool in air and was cooled to 30° C. in about 10 min to 20 min to obtain a particulate solid matter. Then, 3.34 g of ethyl acetate was further added while stirring at 500 rpm (ethyl acetate/Novec 7200=25/75 (wt/wt)). Particles of the fluororesin (A) were obtained by suction filtration and vacuum drying under heating. The obtained particles had an average particle diameter of about 2 mm as measured by a ruler, and included coarse particles having a diameter of about 5 mm to 10 mm.

Example 2-9

A total of 0.017 g of bis (2,3,4,5,6-pentafluorobenzoyl) peroxide as an initiator, 5 g of perfluoro(4-methyl-2-methylene-1,3-dioxolane) as a monomer, and 20 g of Novec 7200 as a polymerization solvent were placed in a glass ampoule having a capacity of 75 mL and were sealed under reduced pressure after repeating nitrogen substitution by freeze degassing and depressurization. When this ampoule was placed in a thermostat at 55° C. and held for 24 h to carry out radical solution polymerization, a solution in which the fluororesin (A) was uniformly dissolved was obtained. After cooling to room temperature, the ampoule was opened, 20 g of AE-3000 was added, and heating at 50° C. was performed while stirring with a magnetic stirrer to obtain a solution in which the fluororesin was uniformly dissolved (AE-3000/Novec 7200)=50/50 (wt/wt)).

The solution was heated to 50° C., transferred into a separable flask with a capacity of 50 mL equipped with a 4-blade slant paddle stirring blade (blade diameter 40 mm, blade width 8 mm, inclination)45° a three-one motor, and a water bath and heated to 50° C., heated to 50° C. while stirring at 150 rpm and held for 10 min. Then, while stirring at 500 rpm (Pv value: 4.4 kW/m$^3$), the water bath was removed, and the solution was allowed to cool in air and was cooled to 30° C. in about 10 min to 20 min to obtain a particulate solid matter. Then, 17.143 g of AE-3000 was added while stirring at 500 rpm (AE-3000/Novec 7200=65/35 (wt/wt)). Particles of the fluororesin (A) were obtained by suction filtration and vacuum drying under heating. The obtained particles were fine particles having a volume average particle diameter of 200 μm and included almost no coarse particles.

Example 2-10

Operations were performed in the same manner as in Example 2-1, except that in Example 2-1, instead of obtaining a particulate solid matter by removing the water bath while stirring the fluororesin (A) solution at 500 rpm (Pv value: 4.4 kW/m$^3$), allowing the solution to cool in air and cooling to 30° C. in about 10 min to 20 min, the particulate solid matter was obtained by switching off the water bath while stirring the fluororesin (A) solution at 500 rpm (Pv value: 4.4 kW/m$^3$), allowing the solution to cool together with the water bath, and cooling to 30° C. in about 150 min.

The obtained particles were fine particles having a volume average particle diameter of 250 μm and included almost no coarse particles.

Comparative Example 2-2

A resin solution was prepared by dissolving the fluororesin A of Synthesis Example 2-1 in FC-72 so as to have a polymer concentration of 10% by weight. Hexane was added to a beaker equipped with a stirrer, the aforementioned resin diluted solution was added to the hexane under stirring to precipitate the resin, and suction filtration was performed to obtain a solid matter. The obtained solid matter had a fluffy shape in which fibers having a length of 5 cm or more were combined together, and there was significant wrapping around the stirrer when the resin solution was added to hexane.

INDUSTRIAL APPLICABILITY

The first aspect of the present invention is useful in the field related to fluororesins. According to the second aspect of the present invention, it is possible to provide a method for producing fluororesin particles including a fluorine-containing aliphatic ring structure, the method excelling in productivity and making it possible to remove foreign matter. The resin particles obtained by the method for producing fluororesin particles including a fluororesin-containing aliphatic ring structure according to the second aspect of the present invention can be applied to various fields such as optical and electronic fields.

The invention claimed is:

1. A method for producing fluororesin particles, wherein each fluororesin particle comprises a flourine-containing aliphatic ring structure, the method comprising:
    adding a fluororesin A to a mixture of a good solvent (b1) and a poor solvent (b2) and dissolving the fluororesin A by heating at a temperature of 50° C. to prepare a solution of the fluororesin A,
    cooling the solution of the fluororesin A to a temperature of 25° C.,
    diluting the cooled solution of the fluororesin A with additional poor solvent (b2) to precipitate the fluororesin A in a mixture of the good solvent (b1) and total poor solvent (b2),
    heating the precipitated mixture to a temperature of 50° C. or higher to form a solution of the fluororesin A in the mixture of the good solvent (b1) and total poor solvent (b2), wherein a ratio of (b1): (b2) is from 30:70 to 80:20; and
    cooling the solution of the fluororesin A in the mixture of the good solvent (b1) and total poor solvent (b2) to a temperature of 30° C. or less in air with stirring,
    thereby precipitating the fluororesin A in the form of particles, wherein the fluororesin A comprises the fluorine-containing aliphatic ring structure.

2. The method according to claim 1, wherein the solvent (b1) is an aromatic fluorine-containing solvent or an aliphatic fluorine-containing solvent having a hydrogen atom.

3. The method according to claim 1, wherein the poor solvent (b2) is a fluorine-containing solvent having a hydrogen atom.

4. The method according to claim 1, wherein the cooling of the solution of the fluororesin A in the mixture of the good solvent (b1) and total poor solvent (b2) satisfies $T_1-T_2$ being at least 5° C., wherein $T_1$ is a temperature of the mixture before the cooling and is at least 50° C. and $T_2$ is a temperature of the mixture after the cooling and is at least 25° C. or less.

5. The method according to claim 1, wherein the cooling the solution of the fluororesin A in the mixture of the good solvent (b1) and poor solvent (b2) is carried out while stirring such that a Pv value of stirrer motor power per unit stirring capacity is from 0.2 kw/m$^3$ to 50 kw/m$^3$.

6. The method according to claim 1, wherein the fluororesin A comprises a residue unit of the following formula (1):

(1)

wherein $Rf_1$, $Rf_2$, $Rf_3$ and $Rf_4$ each independently represent a fluorine atom or are independently selected from the group consisting of a linear, branched, and cyclic perfluoroalkyl group having 1 to 7 carbon atoms, the perfluoroalkyl group optionally comprises an ethereal oxygen atom, and the $Rf_1$, $Rf_2$, $Rf_3$ and $Rf_4$ are optionally linked to each other to form a ring having 4 to 8 carbon atoms, and the ring optionally comprises an ethereal oxygen atom.

7. The method according to claim 1, wherein a cooling time of the solution of the fluororesin A in the mixture of the good solvent (b1) and poor solvent (b2) is in a range of from 1 min to 600 min.

8. The method according to claim 7, wherein the cooling time is in a range of from 5 min to 300 min.

9. The method according to claim 1, wherein the temperature in the cooling of the solution of the fluororesin A in the mixture of the good solvent (b1) and poor solvent (b2) is lowered at a rate of from 0.05° C. to 20° C. per minute.

10. The method according to claim 9, wherein the temperature in the cooling is lowered at a rate of from 0.1° C. to 5° C. per minute.

* * * * *